(12) United States Patent
Xia et al.

(10) Patent No.: US 12,534,753 B2
(45) Date of Patent: Jan. 27, 2026

(54) METHOD FOR IMPROVING SPECIFICITY AND AFFINITY OF APTAMER BY MOLECULAR DESIGN GUIDANCE

(71) Applicant: JIANGNAN UNIVERSITY, Wuxi (CN)

(72) Inventors: Xiaole Xia, Wuxi (CN); Yue Zhang, Wuxi (CN); Ling Gao, Wuxi (CN); Mengfei Long, Wuxi (CN); Qingtong Zhou, Wuxi (CN); Jingwen Zhou, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 1052 days.

(21) Appl. No.: 17/574,746

(22) Filed: Jan. 13, 2022

(65) Prior Publication Data

US 2023/0122792 A1    Apr. 20, 2023

(30) Foreign Application Priority Data

Oct. 18, 2021    (CN) .......................... 202111211545.3

(51) Int. Cl.
| | |
|---|---|
| *C12N 15/115* | (2010.01) |
| *C12Q 1/6811* | (2018.01) |
| *G16B 5/30* | (2019.01) |
| *G16B 15/30* | (2019.01) |

(52) U.S. Cl.
CPC .......... *C12Q 1/6811* (2013.01); *C12N 15/115* (2013.01); *G16B 5/30* (2019.02); *G16B 15/30* (2019.02); *C12N 2310/16* (2013.01)

(58) Field of Classification Search
None
See application file for complete search history.

(56) References Cited

U.S. PATENT DOCUMENTS

| | | | | |
|---|---|---|---|---|
| 10,267,794 | B2 * | 4/2019 | Kim ..................... | G01N 33/542 |
| 11,648,259 | B2 * | 5/2023 | Marquardt ............. | A23L 33/17 |
| | | | | 514/44 R |
| 11,656,235 | B2 * | 5/2023 | Xiao ................... | G01N 33/9486 |
| | | | | 436/93 |
| 11,782,011 | B2 * | 10/2023 | Zhang ................ | G01N 27/3277 |
| | | | | 205/777.5 |
| 2004/0171062 | A1 * | 9/2004 | Hirth .................... | C12N 9/1205 |
| | | | | 435/7.1 |
| 2018/0312999 | A1 * | 11/2018 | Shah ...................... | G16C 20/60 |

FOREIGN PATENT DOCUMENTS

WO    WO-2011020198 A1 *   2/2011   ......... C12N 15/1048

OTHER PUBLICATIONS

Chen et al. (Appl. Environ. Microbiol. 84, e02467-17, pp. 1-23) (Year: 2018).*
Mousivand et al. Biotechnology J 2022 17:2100280, pp. 1-9, first published Nov. 20, 2021 (Year: 2021).*
Mousivand et al. Analytica Chimica Acta 1105, 178-186 (Year: 2020).*
Mousivand et al Analytica Chimica Acta 1105, Supporting information, pp. 1-22 (Year: 2020).*
Mousivand et al. Biotechnol. J. 17:2100280, Supporting information, pp. 1-6, published on Nov. 2021 (Year: 2021).*

* cited by examiner

*Primary Examiner* — Brian Whiteman
(74) *Attorney, Agent, or Firm* — SZDC Law PC

(57) ABSTRACT

The invention relates to the technical field of bioengineering and provides a method for improving the specificity and affinity of an aptamer. The method includes: S1, screening a target of an aptamer from a compound information database by virtual computing; S2, verifying the screening result in Step S1 through experiments; S3, performing virtual saturation mutation on a site of the aptamer, and screening out a mutation site of the aptamer; S4, performing base substitution to the mutation site of the aptamer; and S5, detecting the binding parameter of the aptamer after base substitution with the target screened in Step S1, and selecting an aptamer with improved specificity and affinity after base substitution. An efficient molecular design-guided method is developed by computer rational calculation, to improve the specificity and binding affinity of the aptamer by directional modification. The present invention is of great significance for the practical application of aptamers.

2 Claims, 17 Drawing Sheets

Specification includes a Sequence Listing.

METHOD FOR IMPROVING SPECIFICITY AND AFFINITY OF APTAMER BY MOLECULAR DESIGN GUIDANCE

This application claims priority to Chinese Patent Application No. 202111211545.3, filed on Oct. 18, 2021, which is incorporated by reference for all purposes as if fully set forth herein.

The official copy of the sequence listing is submitted electronically via EFS-Web as an ASCII-formatted sequence listing with a file named "20230613_10015_0079_Sequence_Listing" created on Jun. 13, 2023, and having a size of 468 kilobyte, and is filed concurrently with the specification. The sequence listing contained in this ASCII-formatted document is part of the specification and is herein incorporated by reference in its entirety.

FIELD OF THE INVENTION

The present invention relates to the technical field of bioengineering, and specifically to a method for improving the specificity and affinity of an aptamer by molecular design guidance. An efficient molecular design-guided method for improving the binding specificity and affinity of an aptamer is provided by computer rational calculation, to improve the specificity and binding affinity of the aptamer by directional modification.

DESCRIPTION OF THE RELATED ART

Nucleic acid aptamers are oligonucleotide sequences usually screened from a gene library by Systematic Evolution of Ligands by Exponential Enrichment (SELEX) technology. They are functional nucleic acids that can specifically bind to a target. Nucleic acid aptamers have the advantages of modifiability, small size, and easy production. However, few aptamer products have been used in clinic or market.

At present, aptamer is still in the basic research phase, focusing on how to bind an aptamer to a target; and the application research mainly focuses on biosensors and new drug development, etc (Misiakos K, Kakabakos S. Integrated optoelectronic silicon biosensor for the detection of biomolecules labeled with chromophore groups or nanoparticles: US20050003520[P]. 2005). Important features of aptamers proposed by researchers include specificity and affinity originated from the electrostatic interaction and hydrophobic interaction, and the main factor limiting the specificity and affinity is the conformational flexibility (Eaton B E, Gold L, Zichi D A. Let's get specific: the relationship between specificity and affinity[J]. Chemistry & Biology, 1995, 2(10): 633-8).

Specificity and affinity are very important to the practical application of aptamers. Specificity refers to the specific binding of a target to other chemical substances, and affinity describes the strength of an aptamer to bind its target. Compared with the affinity, the specificity of an aptamer screened is more troublesome, because the specificity is independent of the affinity, and the aptamer screened only with high binding affinity as a goal may not have a high specificity for the target (Carothers J M, Oestreich S C, Szostak J W. Aptamers selected for higher-affinity binding are not more specific for the target ligand. [J]. Journal of the American Chemical Society, 2006, 128(24): 7929-37). For the specificity of aptamers, the most commonly used method at present is counter SELEX, which serves to obtain highly specific aptamers, mainly by excluding some oligonucleotides that can bind to a target analog at the same time, to improve the specificity of the obtained aptamers. However, the exclusion range is limited to target analogs, which has limitations and one-sidedness. Matthew R et al. (Dunn M R, Jimenez R M, Chaput J C. Analysis of aptamer discovery and technology[J]. Nature Reviews Chemistry, 2017, 1(10): 0076) consider that solving the problem of aptamer specificity requires, in subsequent research, the determination of the specificity of aptamers for non-homologous targets, and the determination of the affinity for analogs or common biomolecules present in a complex mixture. The determination results can indicate the possibility of an aptamer to bind to non-homologous targets. To promote the practical use of aptamers in a complex environment, it is necessary to improve their specificity. However, the specificity of aptamers is currently characterized mainly by measuring the binding ability of aptamers with a few target analogs. This has limitations and one-sidedness and is also difficult to characterize the specificity of aptamers through large-scale experimental screening. Problems concerning how many targets an aptamer can bind, how to bind, and whether to bind a predetermined target with the highest specificity remain to be resolved (Demidov V V, MD Frank-Kamenetskii. Two sides of the coin: affinity and specificity of nucleic acid interactions[J]. Trends in Biochemical Sciences, 2004, 29(2): 62-71). In solving these problems, computer rational design gets widespread attention because of high efficiency, small workload in experimental screening, and quickly obtaining of better mutants (Halgren T A, Murphy R B, Friesner R A, et al. Glide: a new approach for rapid, accurate docking and scoring. 2. Enrichment factors in database screening. [J]. Journal of Medicinal Chemistry, 2004, 47(7): 1750-1759).

Mycotoxins are toxic secondary metabolites that can contaminate a variety of foods. Eating food contaminated with toxins can cause serious health risks to humans and animals. Therefore, the establishment of an efficient and accurate method for mycotoxin detection is of great significance to the prevention, control and monitoring of mycotoxins. Mycotoxins have the characteristics of similar molecular structures, wide varieties, trace amounts, and high toxicity. A recognition element with strong specificity and high affinity is critical for the high-sensitivity and rapid detection of mycotoxins. As a new type of functional nucleic acid recognition element, nucleic acid aptamers have specificity and binding affinity to the targets, and have the advantages of small molecule, easy synthesis, easy modification, and relative stability, thus providing a new choice for the detection of toxins and small molecule targets. Therefore, improving the binding specificity and affinity of aptamers for detecting mycotoxins through molecular modification is of great significance for improving the mycotoxin detection ability, and ensuring the food safety and human health. For example, Ochratoxin A (OTA) is a natural mycotoxin with nephrotoxicity and carcinogenicity, and one of the most widespread food contaminants. An aptamer able to recognize OTA with high specificity and affinity is designed and achieved by studying the specificity of OTA aptamers. This is also of great significance for rapid OTA detection and food safety. Aflatoxins are secondary metabolites produced by *Aspergillus flavus*, and the most toxic type of mycotoxins among the known mycotoxins. Aflatoxin B1 (referred to as AFB1) is considered one of the most notorious carcinogens. From the perspective of food safety, it is necessary to develop a sensitive and rapid AFB1 detection method. At present, chromatography and immunological methods are often used for AFB1 detection. Although these technologies are sensitive and accurate enough, they are difficult to be used in field detection. An aptamer able to recognize AFB1 with high specificity and affinity is designed and achieved by studying the specificity of AFB1 aptamers. It is also of great significance for the rapid detection of AFB1 and food safety.

SUMMARY OF THE INVENTION

To solve the above problems, the present invention provides a method for improving the specificity and affinity of an aptamer by using molecular design guidance, which is of great significance for the practical use of aptamers.

According to the technical solutions of the present invention, the method for improving the specificity and affinity of an aptamer by molecular design guidance includes the following steps:
  S1: screening a target of an aptamer from a compound information database by virtual computing (where the screening is feasible if a structural formula of a chemical is provided, whether it is a commercial or natural product, a human metabolite, or a toxin etc.);
  S2: verifying the screening result in Step S1 through experiments;
  S3: performing virtual saturation mutation on a site of the aptamer, and screening out a mutation site of the aptamer;
  S4: performing base substitution to the mutation site of the aptamer; and
  S5: detecting a binding parameter of the aptamer after base substitution with the target screened in Step S1, and selecting an aptamer with improved specificity and affinity after base substitution.

Taking the aptamer OBA3 of Ochratoxin A as an example, the experimental results show that A9G only binds to the target OTA, with a dissociation constant from the target OTA of 0.14 μM; and in a previous literature (Xu G, Zhao J, N Liu, et al. Structure-guided post-SELEX optimization of an ochratoxin A aptamer[J]. Nucleic Acids Research, 2019, 47(11): 5963-5972),
  the dissociation constant of the aptamer OBA3 from the target OTA is 1.4 μM. It can be seen that among the current aptamers that bind to the target OTA, the aptamer A9G binding to the target OTA has the most optimum specificity and affinity. This indicates that after OBA3 is modified by the molecular modification and design method of the present invention, its binding specificity and affinity to the target OTA can be quickly and effectively improved.

Preferably, the aptamer is a mycotoxin aptamer, and Step S5 includes detecting the binding parameter of the mycotoxin aptamer after base substitution with the mycotoxin, and the binding parameter of the mycotoxin aptamer after base substitution with the target screened in Step S1, and selecting a mycotoxin aptamer with improved binding specificity and affinity to the mycotoxin after base substitution.

Preferably, the aptamer is the aptamer OBA3 of Ochratoxin A (having a sequence as shown in SEQ ID NO: 1). In Step S3, the mutation site of the aptamer is the base A at position 9 from the 5' end to the 3' end of the aptamer OBA3, which is substituted with the base T, the base G, and the base C respectively, to obtain the aptamer A9T (having a sequence as shown in SEQ ID NO: 2), A9G (having a sequence as shown in SEQ ID NO: 3), and A9C (having a sequence as shown in SEQ ID NO: 4).

Preferably, the aptamer is an aptamer for Aflatoxin B1, having a sequence as shown in SEQ ID NO: 5. In Step S3, the mutation of the aptamer is to mutate the base A at position 8 and the base T at position 31 from the 5' end to the 3' end into the base C and the base G respectively, to obtain the aptamer A8CT31G (having a sequence as shown in SEQ ID NO: 6); or into the base G and the base C respectively, to obtain the aptamer A8GT31C (having a sequence as shown in SEQ ID NO: 7).

Preferably, in Step S1, the screening method includes predicting the binding conformation and docking score of a target and the aptamer through high-throughput molecular docking, then performing molecular dynamic simulation on the aptamer-target complex, and then predicting the affinity of the aptamer to the target by calculating the binding free energy, to screen out the target of the aptamer.

Specifically, in Step S1, the aptamer is the center during docking, the result of high-throughput virtual screening is combined, and the compounds with the best SP docking score are retained for Prime Molecular Mechanics-Generalized Born and Surface Area (MM-GBSA) calculation, in which the force field energy in an implicit solvent of the molecules involved in the binding process is calculated.

An implicit solvent model is used to relax all the bases in the docking compounds, and finally, compounds with the similar "MMGBSA DG Bind (NS)" (the binding free energy calculated by Prime MM-GBSA) to the target are selected for unconstrained molecular dynamic (MD) simulation.

Unconstrained molecular dynamic simulation of the compounds obtained are performed and the binding free energy is calculated. All compounds are optimized with Gaussian software, and then prepared with the script of Amble software (folding.cnsm.csulb.edu/ffamber-tools.php). The entire system is firstly energy minimized and then heated to 300K under constrained conditions, and then the constraint is gradually reduced.

The molecular dynamics of the docked structure of the stable aptamer-target complex obtained is simulated, and the docked structure of the aptamer-target complex with the lowest potential energy in the simulation process is used as a stable docked structure. All MD simulations are carried out using a common molecular dynamic simulation software such as Gromacs or Amber. Finally, potential targets that can bind to the aptamer are virtually screened out.

Preferably, the binding free energy calculated by Prime MM-GBSA (Molecular Mechanics-Generalized Born Surface Area) calculation is specifically calculated by MM-PBSA.py12.

Preferably, in Step S2, the methods for experimental verification are fluorescence labeling and isothermal titration calorimetry (ITC). Specifically, the binding affinity of the aptamer with the targets screened by calculation is respectively primarily determined by fluorescence labeling with PicoGreen® dye, and the targets with higher affinity are screened out and the binding parameters are measured by ITC. The measured data is fitted by supporting calculation software to obtain the dissociation constant.

Preferably, Step S3 includes specifically:
  SS1: determining a mutable site based on the interaction between aptamer and the target;
  SS2: based on the binding conformation of the aptamer, performing virtual saturation mutation on the mutable site to obtain a hypothetical binding conformation of the mutant sequence; and
  SS3: performing comprehensive analysis including molecular dynamic simulation and calculation of binding free energy on the complex of the mutant sequence of the hypothetical binding conformation with the target, and selecting a site with obvious base enrichment as a mutation site of the aptamer.

Preferably, in Step S4, the detection method is isothermal titration calorimetry.

In the present invention, a molecular modification design method for improving the binding specificity and affinity of an aptamer for detecting mycotoxins is developed by computer rational design and calculation. First, a virtual substrate binding library is established. A target of a mycotoxin aptamer is screened out from the compound information database by virtual screening. Specifically, the binding conformation and docking score of a target and the aptamer is predicted through high-throughput molecular docking, then molecular dynamic (MD) simulation is performed on the aptamer-target complex, to simulate the molecular recognition process of the aptamer and the target, and then the affinity of the aptamer to the target is predicted by calculation from the binding free energy, to screen out a potential target of the aptamer. Then the virtual calculation result is verified through experiments. Since the target binding specificity of the aptamer is highly flexible and is adaptable in the sequence space, the specificity of the aptamer can be optimized by replacing a small number of the bases. Therefore, further with reference to the experimental results, the mutation site is obtained after the second round of virtual screening, base substitution is performed at the site, and then experimental verification is carried out again, to finally obtain a new aptamer with higher specificity and higher binding affinity.

In another aspect, the present invention provides a modified nucleic acid aptamer specifically targeting a target small molecule obtained by the above method, including a molecularly modified aptamer for Ochratoxin A, having a sequence as shown in SEQ ID NO: 3; and a molecularly modified aptamer for Aflatoxin B1, having a sequence as shown in SEQ ID NO: 6.

Compared with the prior art, the technical solution of the present invention has the following advantages. An efficient molecular design-guided method for improving the specificity and binding affinity of an aptamer by computer rational design and calculation, to improve the binding specificity and affinity of the aptamer (in especially mycotoxin detection). Through computational screening, it is discovered and verified that an aptamer may have other unexpected effective targets. Other targets bound by an aptamer are obtained by homology modeling, molecular docking, molecular dynamic simulation, MM/GBSA and other methods. Compounds with the best binding ability to the aptamer are experimentally verified by fluorescence labeling and isothermal titration calorimetry (ITC). Combining the experimental results and the mutation site obtained after the second virtual screening, base substitution is carried out at the site, to mutate and modify the aptamer and obtain a new aptamer. The binding parameters of the modified aptamer to the target are determined by isothermal titration calorimetry (ITC). The experimental results show that the modified aptamer has a significantly higher binding affinity to the ligand (mycotoxin) than other targets, improved specificity, and high binding power. After further improvement, the obtained aptamer only specifically binds to the ligand (mycotoxin), indicating that the molecular modification and design method of the present invention can quickly and effectively improve the binding specificity and affinity of the aptamer, will facilitates the mycotoxin detection, contributes to the development of DNA-targeted drugs and promotes the practical use of the aptamer. This method can also be applied to other functional nucleic acids, including riboswitches and non-coding RNAs.

DETAILED DESCRIPTION OF THE PREFERRED EMBODIMENTS

Figure 1:
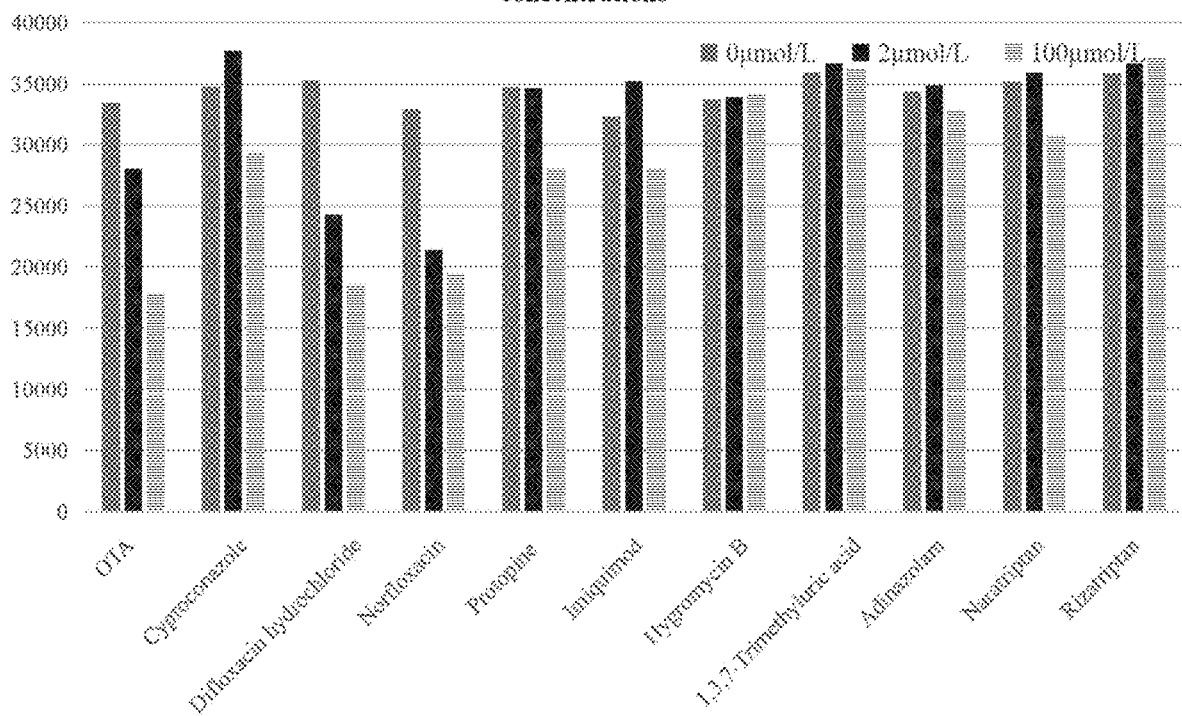
FIG. 1 shows the changes in fluorescence intensity of the OTA aptamer OBA3 binding to different concentrations of targets.
Figure 2:
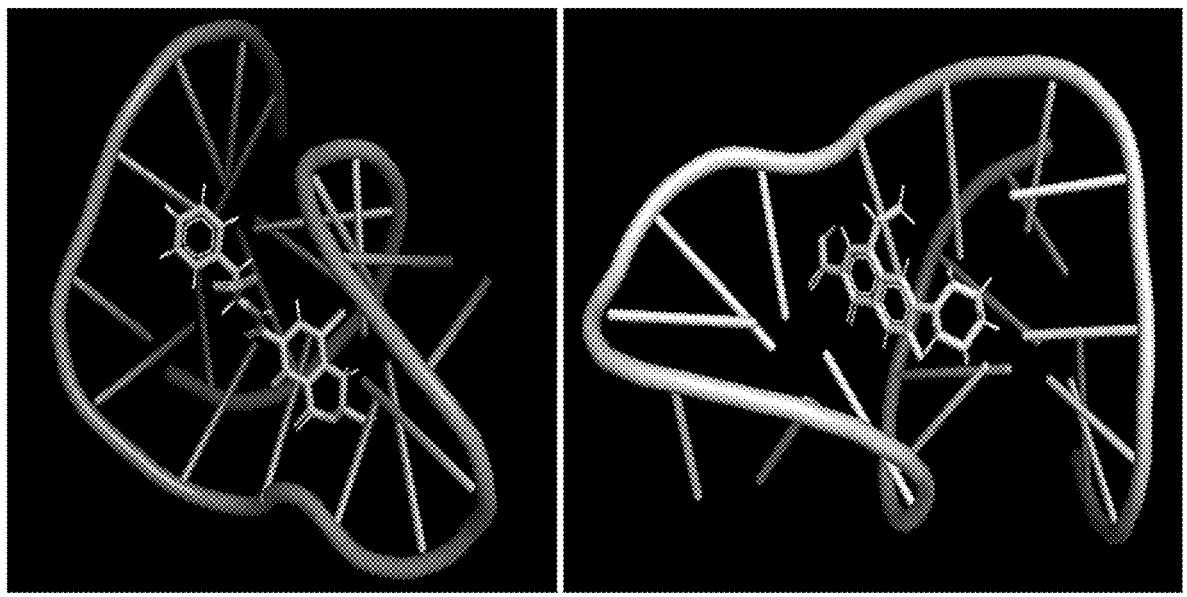
FIG. 2 shows the 3D display of the aptamer OBA3 binding to OTA (left) and Norfloxacin (right).
Figure 3:
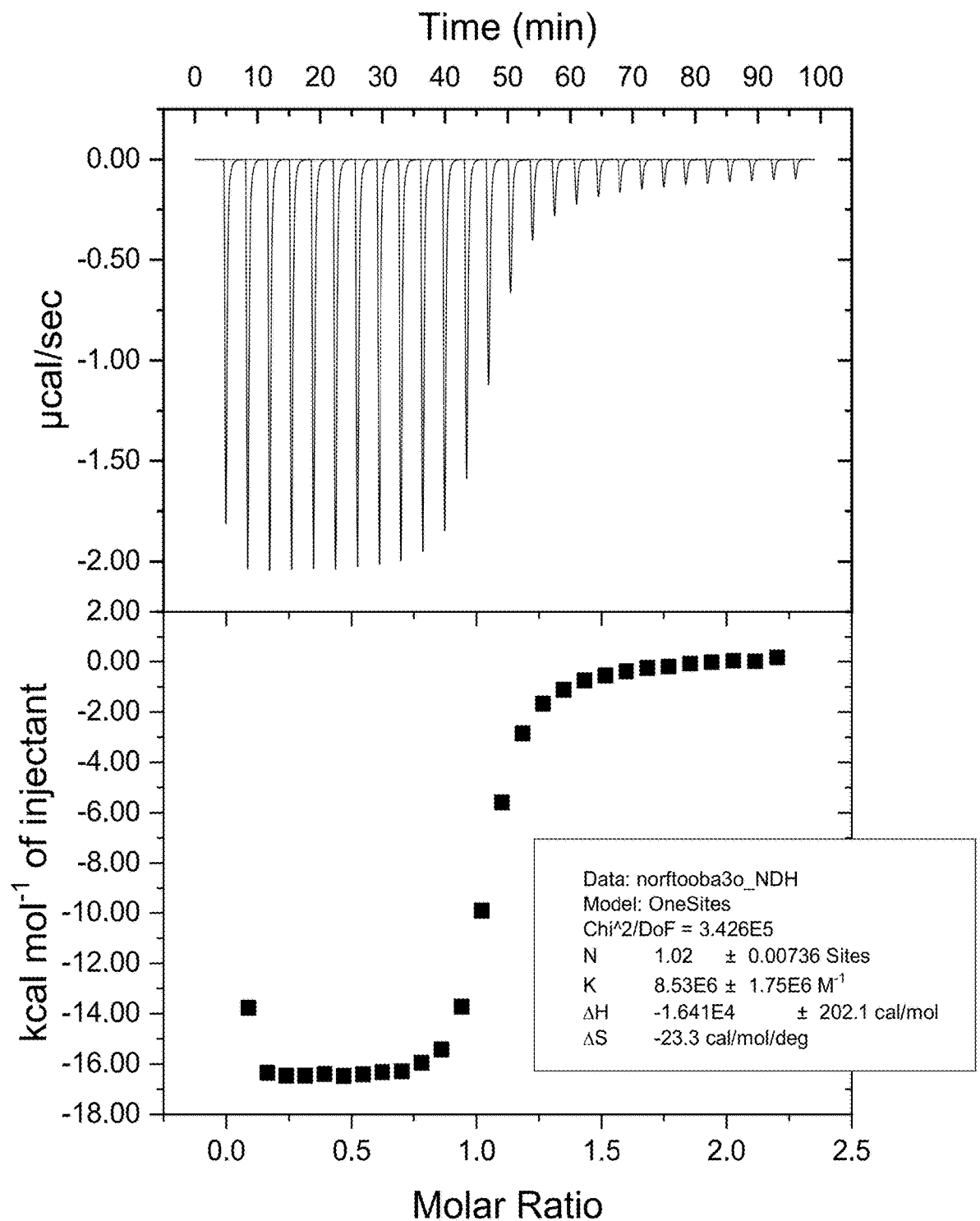
FIG. 3 shows the result of the ITC experiment of Norfloxacin with the aptamer OBA3.
Figure 4:
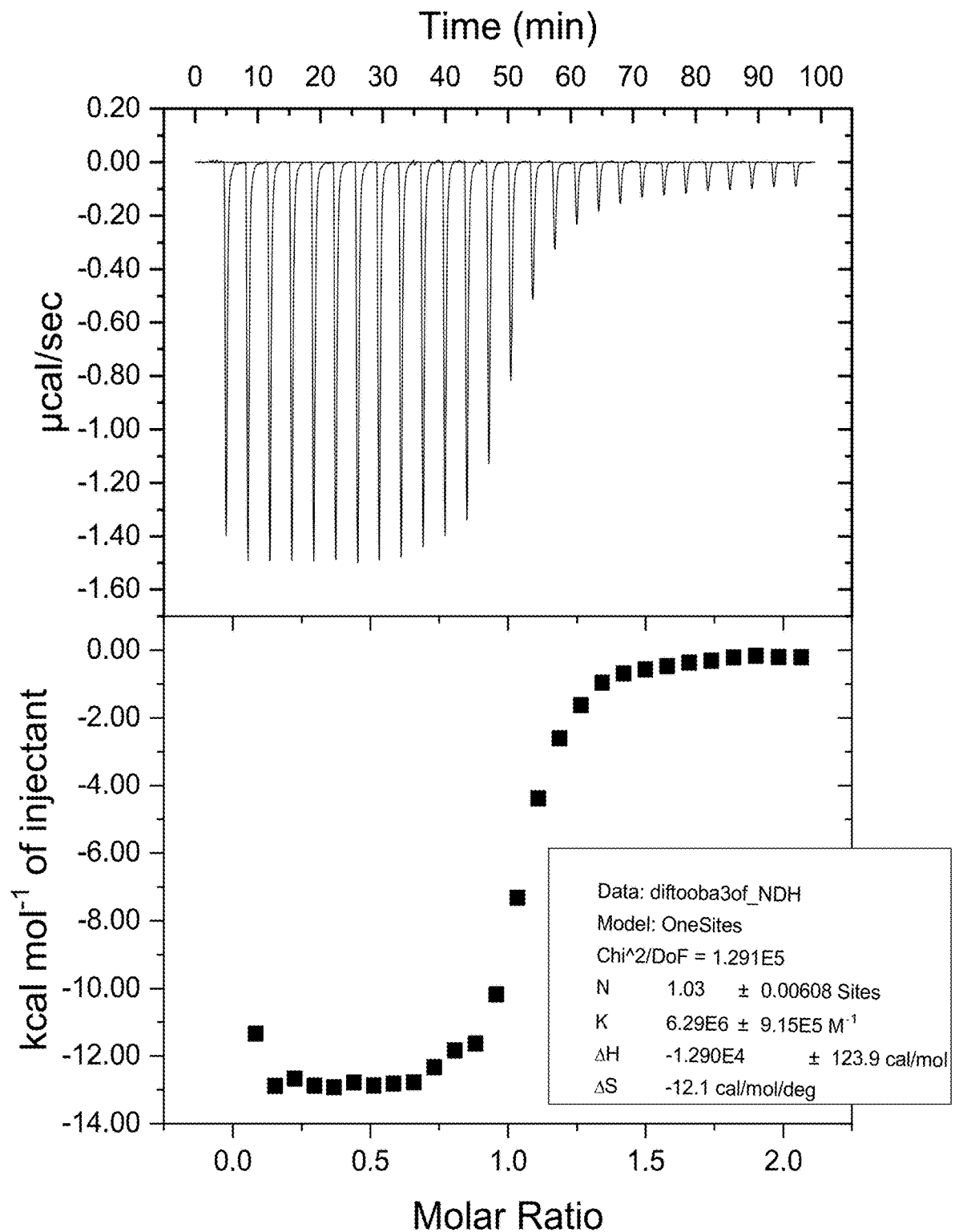
FIG. 4 shows the result of the ITC experiment of Difloxacin hydrochloride with the aptamer OBA3.
Figure 5:
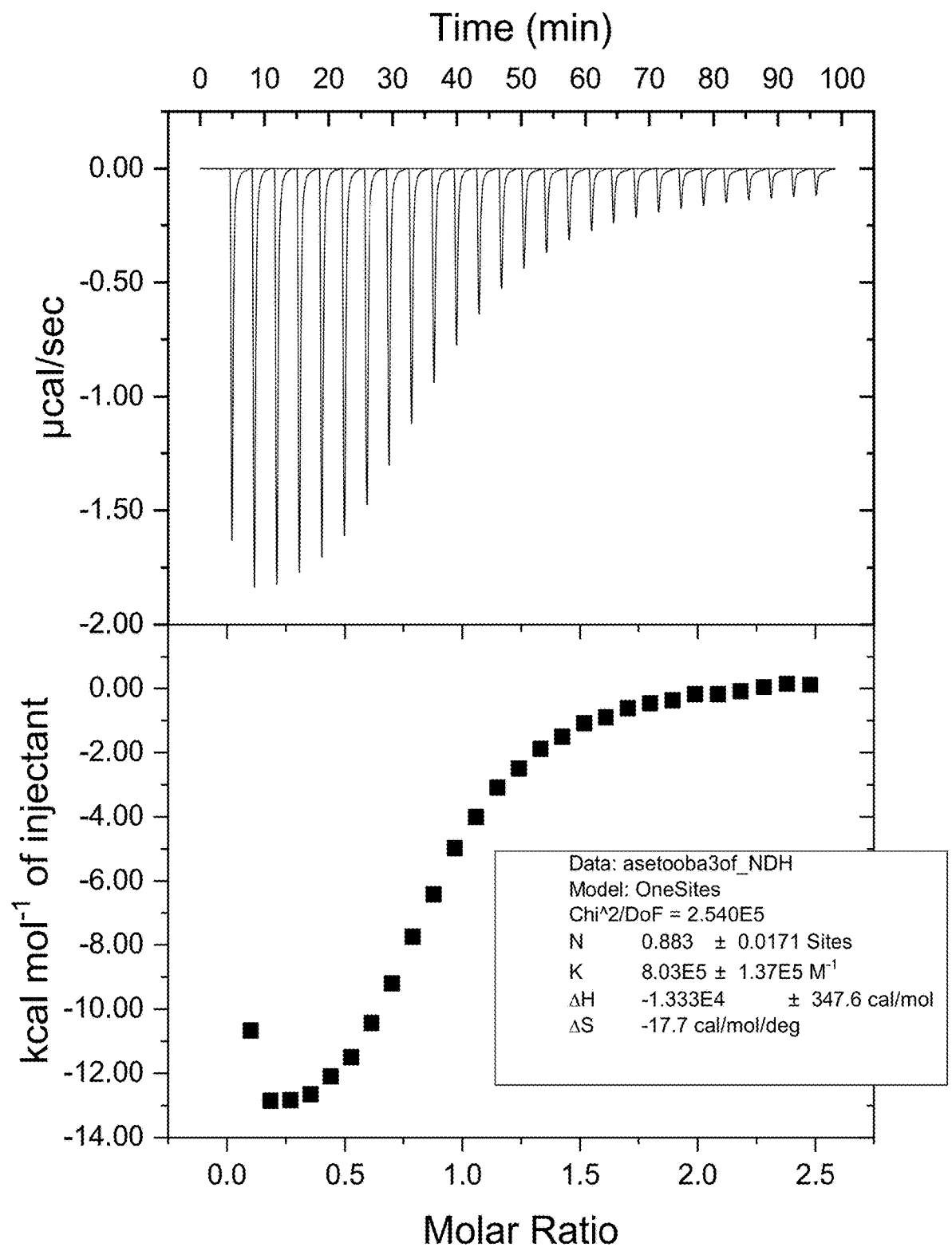
FIG. 5 shows the result of the ITC experiment of Asenapine with the aptamer OBA3.
Figure 6:
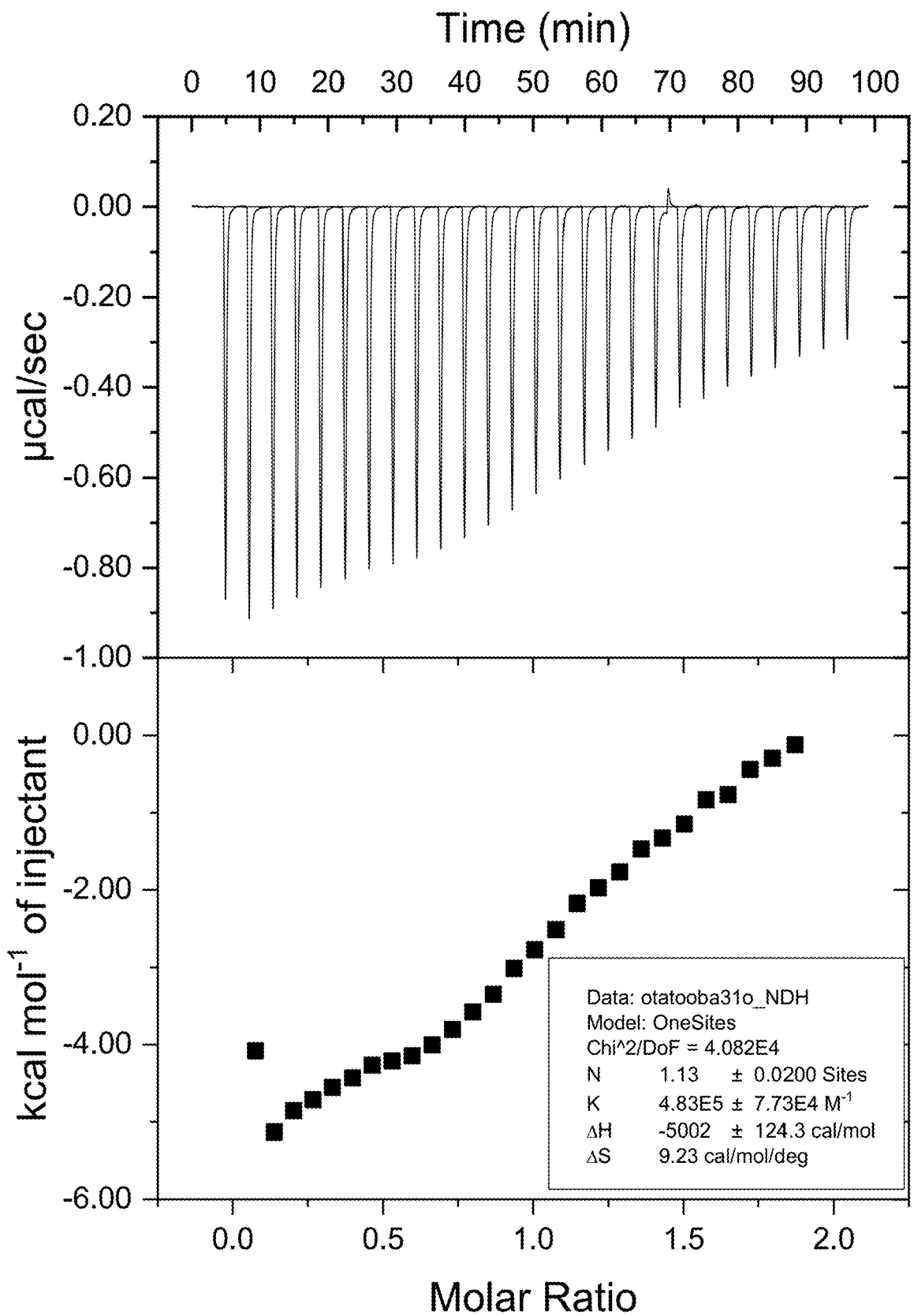
FIG. 6 shows the result of the ITC experiment of OTA with the aptamer A9T.
Figure 7:
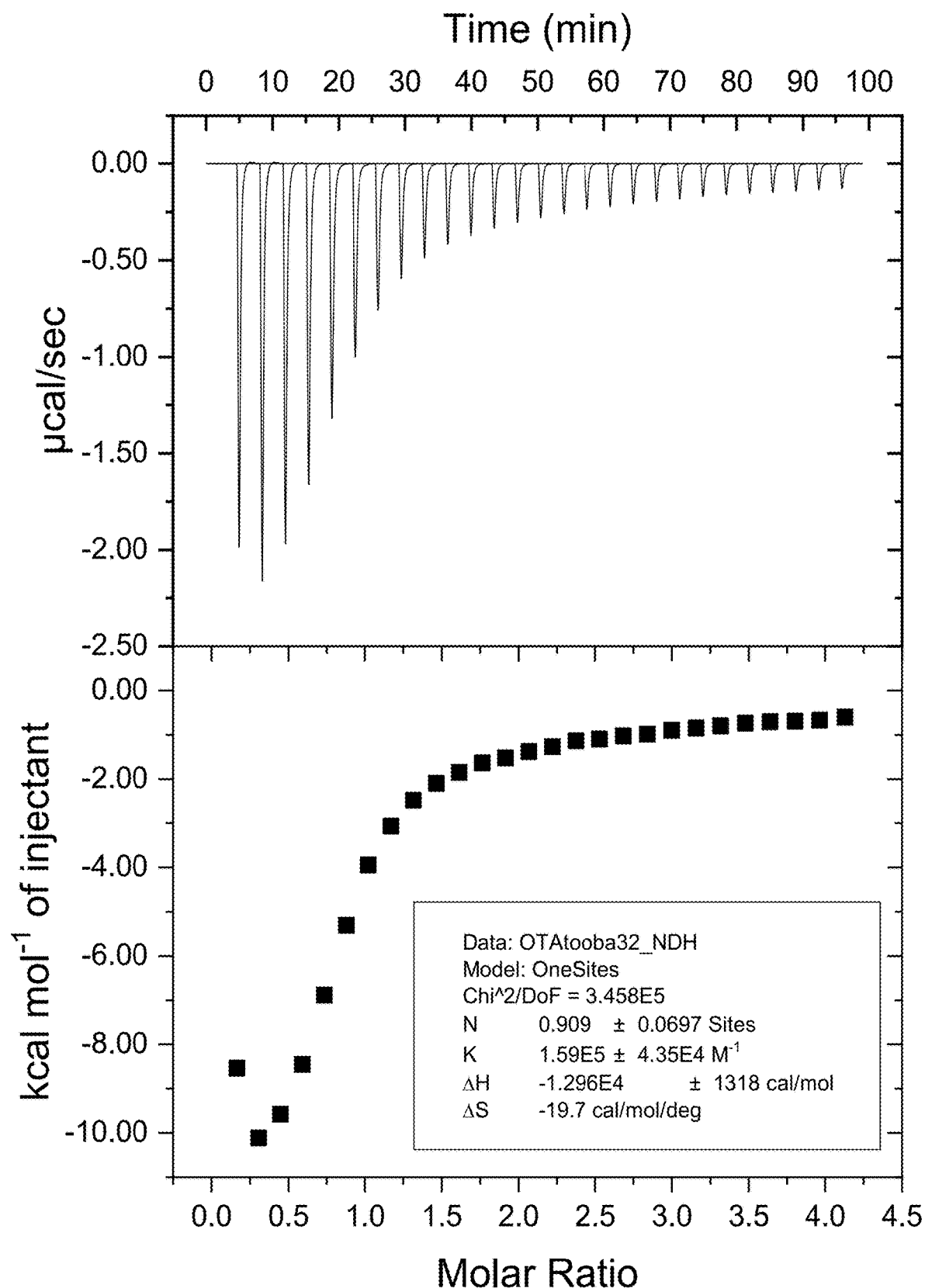
FIG. 7 shows the result of the ITC experiment of OTA with the aptamer A9G.
Figure 8:
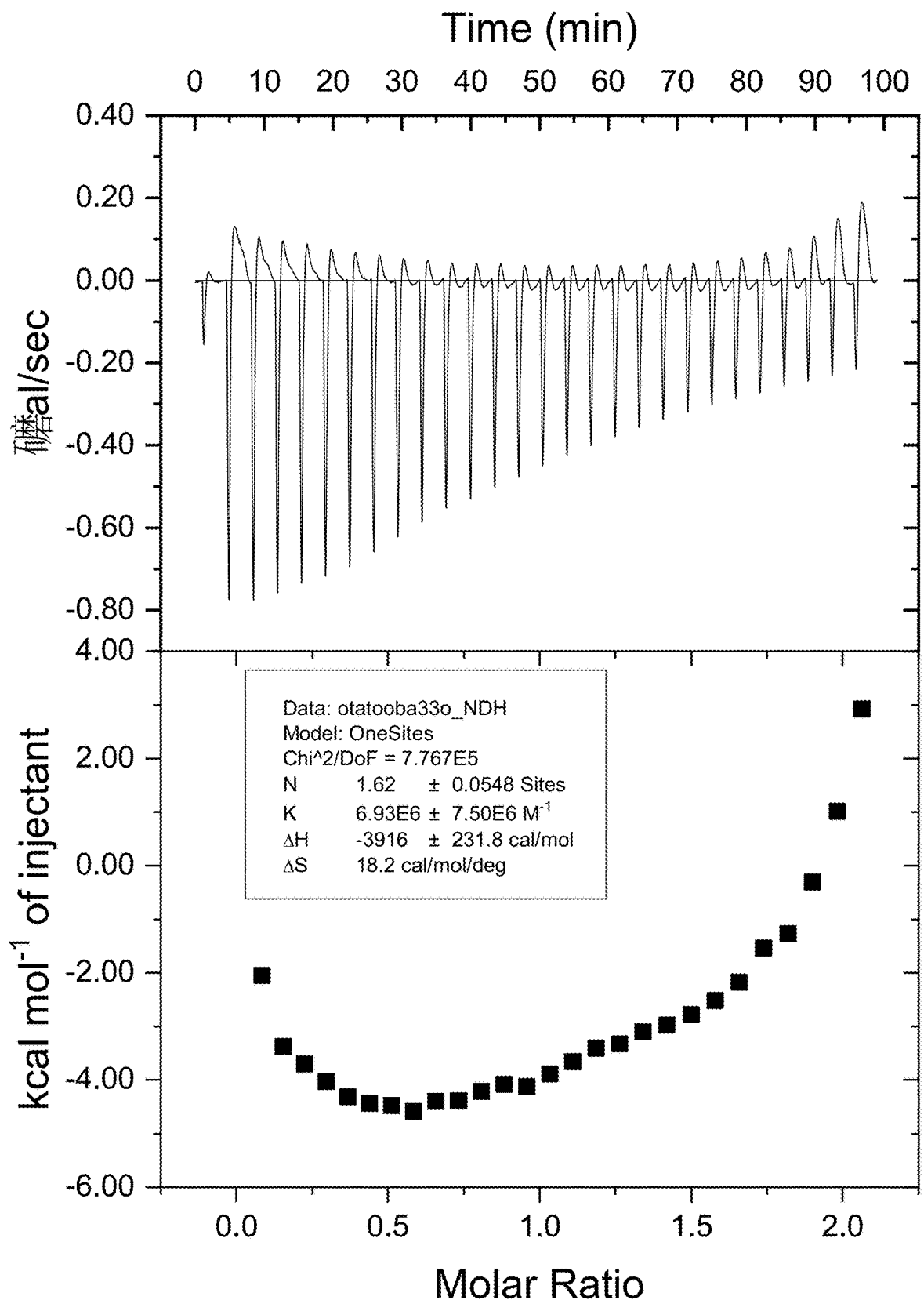
FIG. 8 shows the result of the ITC experiment of OTA with the aptamer A9C.
Figure 9:
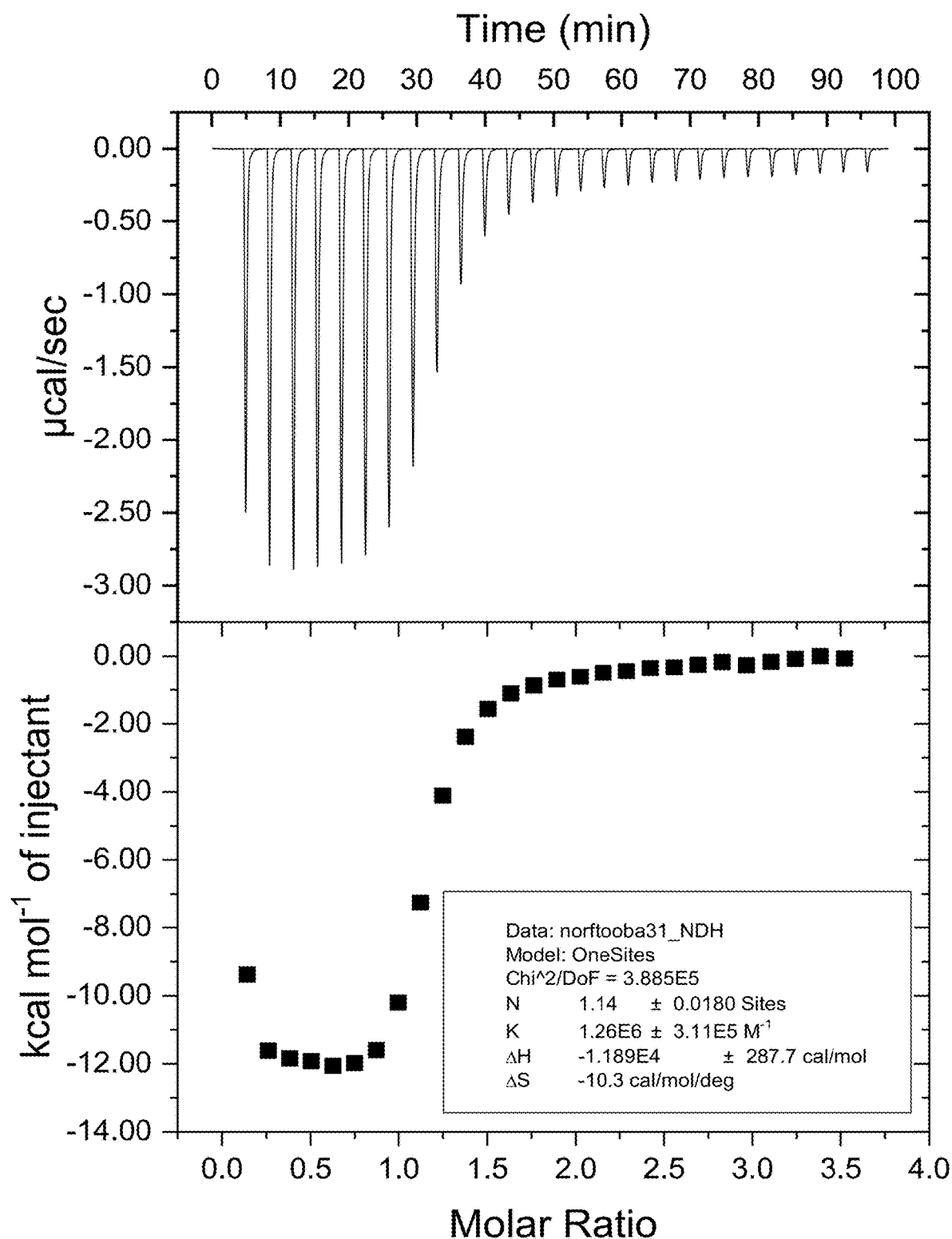
FIG. 9 shows the result of the ITC experiment of Norfloxacin with the aptamer A9T.
Figure 10:
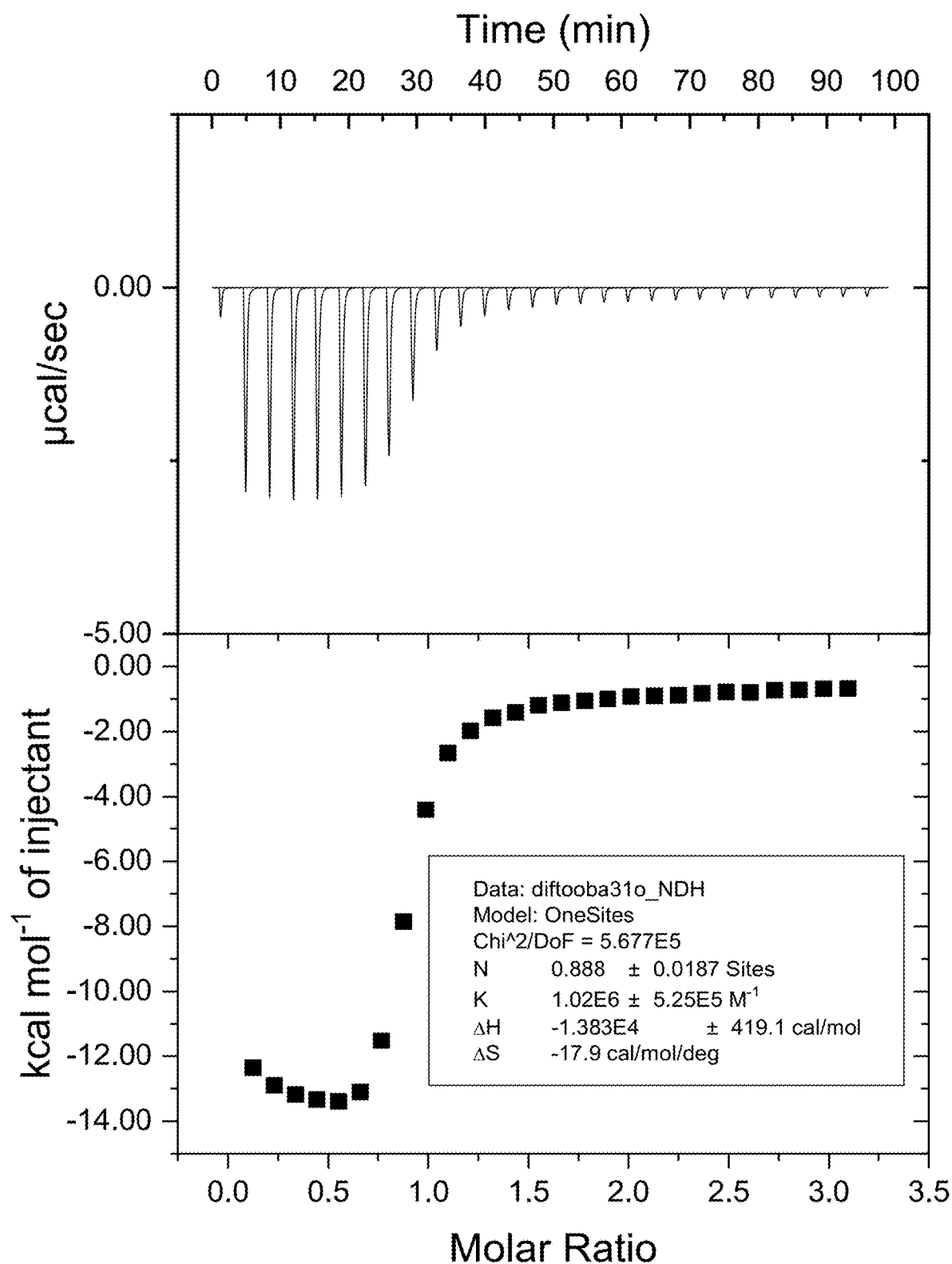
FIG. 10 shows the result of the ITC experiment of Difloxacin hydrochloride and the aptamer A9T.

The present invention will be further described below with reference to the accompanying drawings and specific examples, so that those skilled in the art can better understand and implement the present invention; however, the present invention is not limited thereto.

The reagent raw materials mentioned in the following examples are all commercially available common raw materials unless otherwise indicated. The reagents are prepared by conventional methods. The methods that are not detailed in examples are routine operations in the art.

Example 1: Molecular Modification Method to Improve the Specificity and Affinity of Ochratoxin Aptamer 1. Screening of Targets of Ochratoxin Aptamer Different aptamers of different mycotoxin targets were sorted and compared, and the aptamer OBA3 for Ochratoxin A (OTA) was used as the object for modification, where the base sequence of OBA3 has been reported (Xu G, Zhao J, N Liu, et al. Structure-guided post-SELEX optimization of an ochratoxin A aptamer[J]. Nucleic Acids Research, 2019, 47(11): 5963-5972). All compounds were prepared by the LigPrep module, and the compounds were retrieved from the compound information database (including Protein Data Bank (PDB), and ZINC database, etc.). The docking grid was centered on the aptamer OBA3, and all compounds were docked by Glide SP1. After combining with the results of high-throughput virtual screening, the compounds with the best docking scores were retained for Prime MM-GBSA (Molecular Mechanics-Generalized Born Surface Area) calculation. In the calculation, the force field energy of the molecules involved in the binding process in an implicit solvent was calculated. In the presence of an OPLS3 force field, all the bases in the docking compound 6 Å were relaxed by the VSGB2.0 model. Finally, compounds (targets) with similar "MMGBSA dG Bind (NS)" (binding free energy calculated by Prime MM-GBSA) to OTA were selected for unconstrained molecular dynamic (MD) simulation. Virtual screening was made according to the original docking score of the target OTA and the aptamer OBA3 and the MMGBSA dG Bind (NS).

2. The Preliminary Binding Affinity of the Compounds Obtained by Computational Screening to the Aptamer were Respectively Determined by Fluorescence Labeling.

PicoGreen® dye is a fluorescent dye that only recognizes and binds to the spiral grooves of double-stranded DNA, and does not bind to single-stranded DNA. After binding to double-stranded DNA, the fluorescence increases. When the aptamer binds with OTA, the remaining unbound aptamers will hybridize with the complementary strand of the aptamer in the reaction system to form double-stranded DNA. PicoGreen® dye recognizes and binds to double-stranded DNA. When different concentrations of a target are bound to a specific concentration of aptamer, the fluorescence intensity is different, and the generated fluorescence is proportional to the DNA concentration. The binding affinity of the aptamer to the target can be characterized by the change of the fluorescence signal.

2.1. Binding affinity test of OBA3 to OTA (control): Using a buffer (pH 7.4) as a diluent, the aptamer OBA3 (25 μL, 1 μmol/L) and 50 μL of different concentrations (0 μM/L, 2 μM/L, and 100 μM/L) of OTA solution were mixed in wells of a microplate. Each solution was incubated at 25° C. for 10 min. Then, a complementary strand DNA3 (25 μL, 1 μmol/L, having a sequence as shown in SEQ ID NO: 8) of the aptamer and 20 μL 5×PG were added to the solution. After incubation for 5 min, the fluorescence intensity was scanned on a microplate reader at an excitation wavelength of 480 nm and an emission wavelength of 525 nm.

2.2. Binding affinity test of OBA3 to target Cyproconazole: Using a buffer (pH 7.4) as a diluent, the aptamer OBA3 (25 μL, 1 μmol/L) and 50 μL of different concentrations (0 μM/L, 2 μM/L, and 100 μM/L) of Cyproconazole solution were mixed in wells of a microplate. Each solution was incubated at 25° C. for 10 min. Then, a complementary strand DNA3 (25 μL, 1 μmol/L) of the aptamer and 20 μL 5×PG were added to the solution. After incubation for 5 min, the fluorescence intensity was scanned on a microplate reader at an excitation wavelength of 480 nm and an emission wavelength of 525 nm.

2.3. The same method as that in Step 2.1 or 2.2 was used, except that the target was replaced respectively by Difloxacin hydrochloride, Norfloxacin, Protopine, Lmiquimod, Hygromycin B, 1,3,7-Trimethyluric acid, Adinazolam, Naratriptan, Rizatriptan, Asenapine, Indacaterol, and Mosapride.

The results are shown in FIG. 1. A total of 14 compounds are tested. Different concentrations (0 μM/L, 2 μM/L, and 100 μM/L) of compounds are bound to the aptamer OBA3. As the target concentration increases, the aptamer binds to the target, so the remaining unbound aptamer decreases, the double-stranded DNA formed by hybridizing with the complementary strand of the aptamer decreases, and the fluorescence intensity decreases. Accordingly, 5 targets with high affinity including Mosapride, Indacaterol, Asenapine, Norfloxacin, and Difloxacin hydrochloride were selected, and the binding parameters were determined by ITC (isothermal titration calorimetry). The test data was fitted by support calculation software to obtain the dissociation constant. FIG. 2 shows the 3D display of the aptamer OBA3 binding to OTA (left) and Norfloxacin (right).

3. Based on the Actual Results in Step 2, the Binding Parameters were Determined by ITC (Isothermal Titration Calorimetry).

ITC is a method in which one reactant is used to titrate another reactant, and the temperature change of the reaction system is measured as the amount of the titrant added changes. In the method, a calorimetric curve of a changing process is continuously and accurately recorded by a highly sensitive and highly automated microcalorimeter, to provide thermodynamic and kinetic information. In this way, complete thermodynamic parameters of biomolecular interactions can be obtained. Time interval: 210 s, stirring speed: 502 RPM, initial delay: 60 s, thermal equilibrium: 25° C. The concentration ratio of the aptamer to small molecule target was 1:5-20.

3.1. Using a buffer as a diluent, the OTA was diluted into a solution with a concentration of 300 μmol/L, and the nucleic acid aptamer OBA3 was diluted into a solution with a concentration of 20 μmol/L. After titration by using an isothermal titration calorimeter, the data was plotted and fitted by support software to obtain the dissociation constant.

3.2. The same method as that in Step 3.1 was used, except that the Norfloxacin was diluted into a solution with a concentration of 330 μmol/L, and the nucleic acid aptamer OBA3 was diluted into a solution with a concentration of 30 μmol/L.

3.3. The same method as that in Step 3.1 was used, except that the Difloxacin hydrochloride was diluted into a solution with a concentration of 300 μmol/L, and the nucleic acid aptamer OBA3 was diluted into a solution with a concentration of 30 μmol/L.

3.4. The same method as that in Step 3.1 was used, except that the Mosapride was diluted into a solution with a concentration of 300 μmol/L, and the nucleic acid aptamer OBA3 was diluted into a solution with a concentration of 30 μmol/L.

3.5. The same method as that in Step 3.1 was used, except that the Asenapine was diluted into a solution with a concentration of 300 μmol/L, and the nucleic acid aptamer OBA3 was diluted into a solution with a concentration of 30 μmol/L.

The experimental results are shown in Table 1 and FIGS. 3-5 (the data and figures are not presented for ones having weak or no binding). The aptamer OBA3 has a dissociation constant of 0.12 µM from the target Norfloxacin, the aptamer OBA3 has a dissociation constant of 0.16 µM from the target Difloxacin hydrochloride, and the aptamer OBA3 has a dissociation constant of 1.25 µM from the target Asenapine. As shown in Table 2, the dissociation constant of the aptamer OBA3 from the target OTA in a previous literature is 1.4 µM, and Mosapride does not bind to OBA3. This indicates that targets with higher affinity to the aptamer OBA3 are screened out.

TABLE 1

Experimental results of aptamer OBA3 binding to different targets by ITC

| Target | OTA | Norfloxacin | Difloxacin |
|---|---|---|---|
| Aptamer | OBA3 | OBA3 | OBA3 |
| Instrument | VP-ITC | VP-ITC | VP-ITC |
| N (sites) | 1.09 ± 0.012 | 1.06 ± 0.008 | 1.03 ± 0.006 |
| K ($M^{-1}$) | 5.77E5 ± 4.34E4 | 7.78E6 ± 1.60E6 | 6.29E6 ± 9.15E5 |
| $K_d$ (µmol/L) | 1.73 | 0.13 | 0.16 |

TABLE 2

Sequences of various aptamers for OTA and disassociation constants

| Name | Sequence | Kd (µM) |
|---|---|---|
| OBAwt | GGGGTGAAACGGGTCCCG (SEQ ID NO: 10) | 81 ± 2 |
| OBA1 | CGGGGTGAAACGGGTCCCG (SEQ ID NO: 11) | 5.9 ± 0.1 |
| OBA2 | GGGGCGAAGCGGGTCCCG (SEQ ID NO: 12) | 26.2 ± 0.4 |
| OBA3 | CGGGGCGAAGCGGGTCCCG (SEQ ID NO: 1) | 1.4 ± 0.1 |
| OBA4 | GGGGTGAAACG GTCCCG (SEQ ID NO: 13) | No Binding |
| OBA5 | CCGGGGCGAAGCGGGTCCCGG (SEQ ID NO: 14) | 1.9 ± 0.1 |
| OBA6 | GCGGGGCGAAGCGGGTCCCGC (SEQ ID NO: 15) | 2.4 ± 0.1 |

4. Virtual Saturation Mutation of Sites of Aptamer OBA3

The original aptamer OBA3 of Ochratoxin A is a DNA strand with 19 base, in which the residues G4, G5, C11, G12, T15 and C16 form a binding pocket to bind OTA. OTA binds to OBA3 through the hydrophobic interaction between T15 and the benzene ring of OTA, the hydrogen bonding between the amido group of OTA and the residues G4, G5 and G12, the halogen bonding between the chlorine atom of OTA and G5, and the ternary stacking of base pairs at G5-C11 of OTA with G12-G4-C16. Therefore, the importance of residues G4, G5, C11, G12, T15 and C16 is evident, so these sites are retained. The bases in the top stem area (base Nos. 6-10) and the bottom stem area (base Nos. 1-3, 13-14, and 17-19) were mutated, and the mutant sequence is shown in SEQ ID NO: 16.

Figure 11:
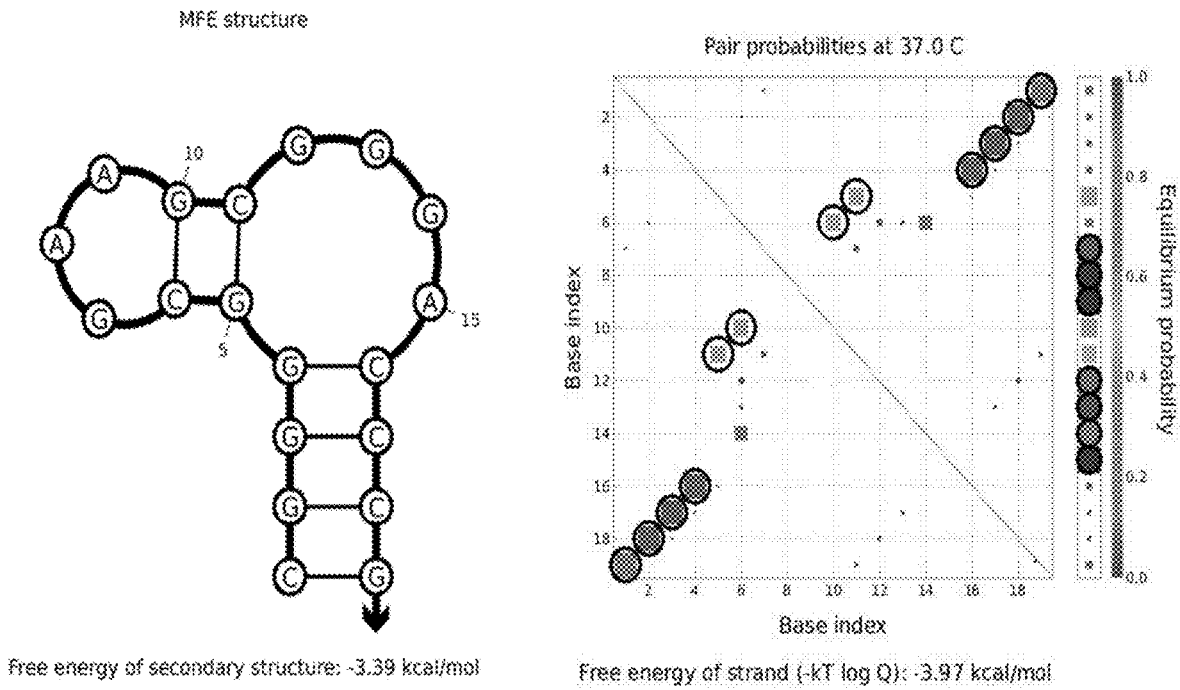
FIG. 11 shows the predicted secondary structure of A9T and the free energy of a single strand thereof, the predicted secondary structure of A9T having a sequence as shown in SEQ ID NO: 2.
Figure 12:
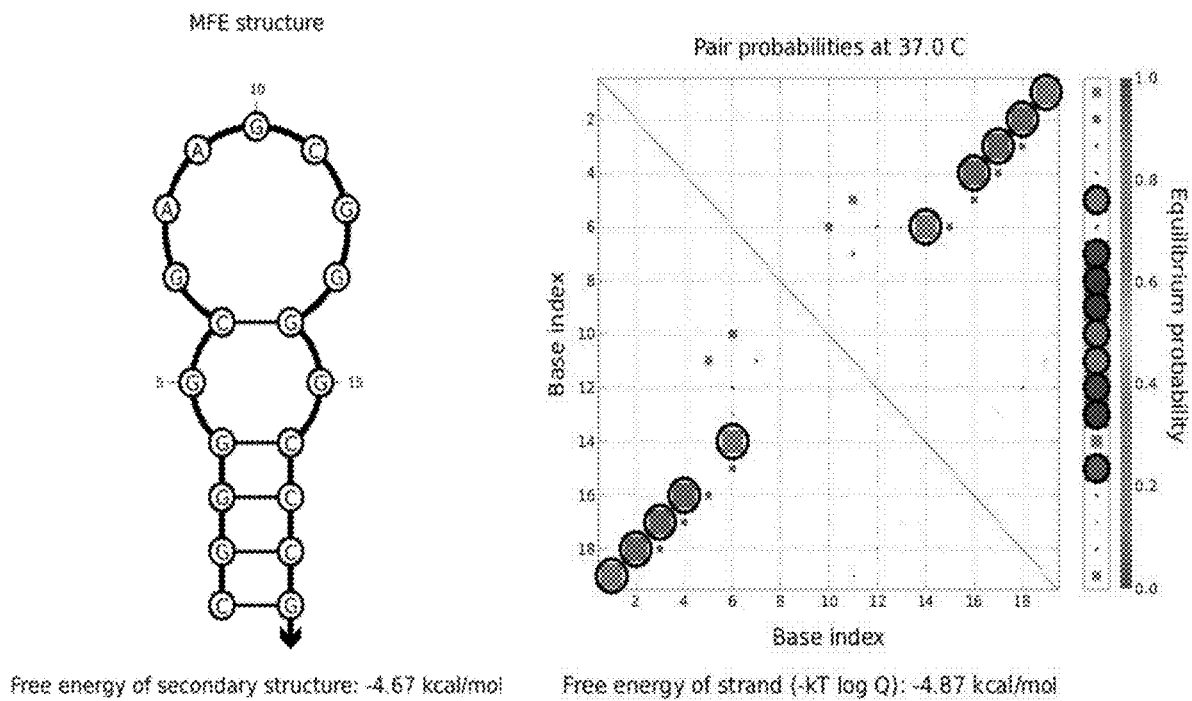
FIG. 12 shows the predicted secondary structure of A9G and the free energy of a single strand thereof, the predicted secondary structure of A9G having a sequence as shown in SEQ ID NO: 3.
Figure 13:
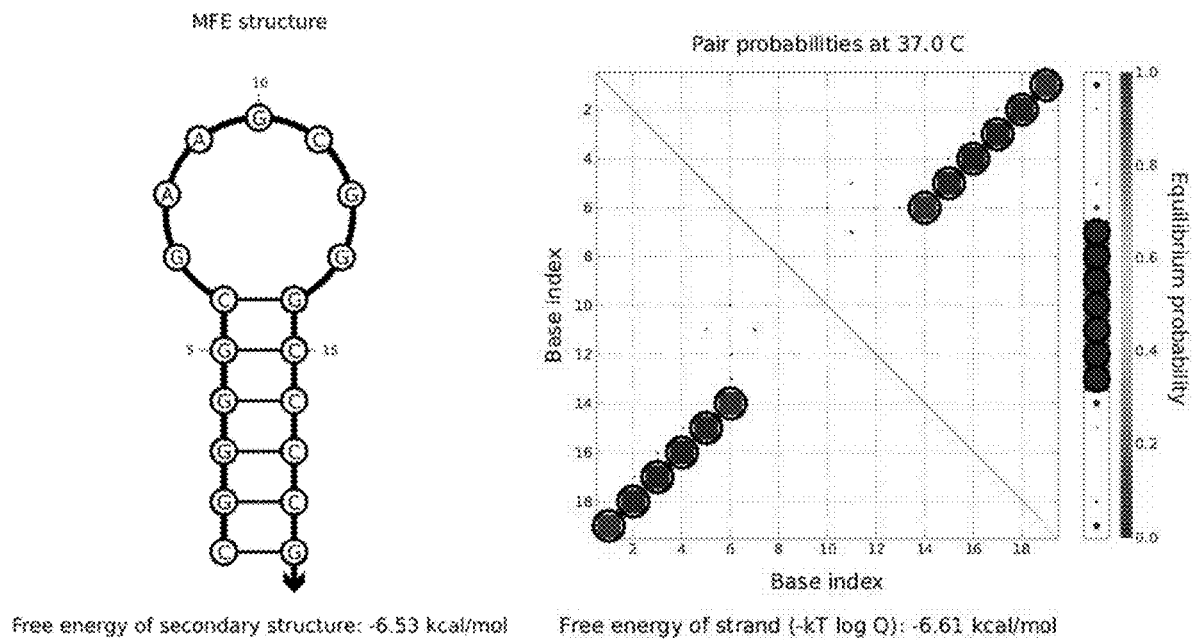
FIG. 13 shows the predicted secondary structure of A9C and the free energy of a single strand thereof, the predicted secondary structure of A9C having a sequence as shown in SEQ ID NO: 4.

There were a total of 13 specific mutation sites, and a total of 413 new sequences were generated. All possible 67,108,864 sequences were comprehensively analyzed, and the structure corresponding to minimum free energy and the minimum free energy were predicted by NUPACK software. as shown in FIG. 11-13.

Next, base mutation was performed on the basis of the original binding conformation of the aptamer to obtain a hypothetical binding conformation of the mutant sequence. Then molecular dynamic simulation was performed by the software Gromacs, to determine whether the hypothetical binding mode is stable and whether it maintains a high binding affinity to the target. The original binding conformation was derived from the PDB library, and the base mutation was performed using X3DNA to obtain the hypothetical binding conformation of the mutant sequence. The simulation system first underwent 5 rounds of energy minimization optimization by steepest descent, and then slowly heated up to 300 k while the solute was constrained, followed by a constraint release process for 60 ps at a step length of 10 fs.

Next, the binding free energy was calculated. The binding ability of the aptamer to the target was a simulated path of the complex, a predicted value of the binding free energy was estimated by using the MMPBA method and the conformational entropy, and the binding free energy was calculated by MMPBA.py in the AmberTools program package.

Virtual screening of the mutation sites was made according to the original docking score of the target OTA and the aptamer OBA3 and the MMGBSA dG Bind (NS). In order to improve the screening efficiency, 32768 sequences with a small free energy barrier were selected and used as an enhanced sequence library. The screening criterion was that the free energy barrier ($\Delta\Delta G_{GAP}$) was less than 0.1 kcal/mol. Firstly, molecular dynamic simulation was performed on the 32768 sequences for 150 ps. Then, according to the structural stability, binding free energy, and number of hydrogen bonding between the aptamer and the target, 1092 sequences were selected for 1 ns of molecular dynamics simulation. Next, 132 sequences were selected for 10 ns of molecular dynamic simulation in the third round of screening. Finally, in the fourth round, 30 sequences were subjected to molecular dynamic simulation for a long time of 100 ns, to investigate the overall stability of the complex. Ultimately, it was found that except for the position 9, there was no obvious base enrichment at other positions, and these bases were not enriched at the corresponding positions. Therefore, the site A9 was selected for base mutation, and mutated into T9, G9 and C9 respectively. Then further experiments were carried out.

5. Mutation of Aptamer OBA3

The base A at position 9 from the 5' end to the 3' end of the aptamer OBA3 was mutated into the base T, the base G, and the base C to obtain the aptamer A9T, A9G, and A9C, respectively.

6. The Binding Parameters of the Aptamer A9T, A9G, and A9C to the Target OTA, Norfloxacin, Difloxacin Hydrochloride, and Asenapine were Determined by Isothermal Titration Calorimetry (ITC)

The experimental results are shown in Tables 3-5 and FIGS. 6-10 (the data and figures are not presented for ones having weak or no binding). The predicted secondary structures of the aptamers A9T, A9G and A9C and the free energy of their single strands are shown in FIGS. 11 to 13 respectively.

A9G only binds to the target OTA, and has a dissociation constant from the target OTA of 0.14 µM; and the aptamer OBA3 has a dissociation constant from the target OTA of 1.4 µM in a previous literature, so the specificity and affinity are both improved. A9C only binds to the target OTA, and has a dissociation constant from the target OTA of 6.29 µM, so the specificity is improved compared with OTA3. A9T has a dissociation constant from the target OTA of 2.07 µM, and has a dissociation constant from the target Norfloxacin of 0.79 µM.

These indicate that after modification by the molecular modification and design method of the present invention, OBA3 can quickly and effectively improve its binding specificity and affinity to the target OTA.

TABLE 3

Experimental results of aptamer A9C binding to different targets by ITC

| Target | OTA | Norfloxacin | Difloxacin hydrochloride |
|---|---|---|---|
| Aptamer | A9C | A9C | A9C |
| Instrument | VP-ITC | VP-ITC | VP-ITC |
| N (sites) | 0.91 ± 0.069 | | |
| K (M$^{-1}$) | 1.59E5 ± 4.35E4 | | |
| Kd (µmol/L) | 6.29 | | |
| Remark | | No Binding | No Binding |

TABLE 4

Experimental results of aptamer A9G binding to different targets by ITC

| Target | OTA | Norfloxacin | Difloxacin |
|---|---|---|---|
| Aptamer | A9G | A9G | A9G |
| Instrument | VP-ITC | VP-ITC | VP-ITC |
| N (sites) | 1.62 ± 0.055 | | |
| K (M-1) | 6.93E6 ± 7.50E6 | | |
| Kd (µmol/L) | 0.14 | | |
| Remark | | No Binding | No Binding |

TABLE 5

Experimental results of aptamer A9T binding to different targets by ITC

| Target | OTA | Norfloxacin | Difloxacin |
|---|---|---|---|
| Aptamer | A9T | A9T | A9T |
| Instrument | VP-ITC | VP-ITC | VP-ITC |
| N (sites) | 1.13 ± 0.020 | 1.14 ± 0.018 | 0.888 ± 0.019 |
| K (M-1) | 4.83E5 ± 7.73E4 | 1.26E6 ± 3.11E5 | 1.02E6 ± 5.25E5 |
| Kd (µmol/L) | 2.07 | 0.79 | 0.98 |

Example 2: Molecular Modification Method to Improve the Specificity and Affinity of Aflatoxin B1 Aptamer 1. Screening of Targets of Aflatoxin B1 Aptamer Different aptamers of different mycotoxin targets were sorted and compared, and the aptamer (having a sequence as shown in SEQ ID NO: 5) for Aflatoxin B1 (referred to as AFB1) was used as the object for modification. All compounds were prepared by the LigPrep module, and the compounds were retrieved from the compound information database (including Protein Data Bank (PDB), and ZINC database, etc.). The docking grid was centered on the Aflatoxin B1 aptamer (referred to as AFB1 aptamer hereinafter), and all compounds were docked by Glide SP1. After combining with the results of high-throughput virtual screening, the compounds with the best docking scores were retained for Prime MM-GBSA calculation. In the calculation, the force field energy of the molecules involved in the binding process in an implicit solvent was calculated. In the presence of a CHARMM force field and a CGenFF force field in combination, all the bases in the docking compound 6 Å were relaxed by the VSGB2.0 model. Finally, compounds with the similar "MMGBSA DG Bind (NS)" (the binding free energy calculated by Prime MM-GBSA) to Aflatoxin B1 were selected for unconstrained molecular dynamic simulation. Virtual screening was made according to the docking score of the original target AFB1 and the AFB1 aptamer and the MMGBSA dG Bind (NS).

2. The Preliminary Binding Affinity of the Compounds Obtained by Computational Screening to the Aptamer were Respectively Determined by Fluorescence Labeling.

2.1. Binding affinity test of AFB1 aptamer to AFB1 (control): Using a buffer (pH 7.4) as a diluent, the aptamer (25 µL, 1 µmol/L) and 50 µL of different concentrations (0 µM/L, 2 µM/L, and 100 µM/L) of AFB1 solution were mixed in wells of a microplate. Each solution was incubated at 25° C. for 10 min. Then, a complementary strand CDNA (25 µL, 1 µmol/L) of the aptamer and 20 µL 5×PG were added to the solution. After incubation for 5 min, the fluorescence intensity was scanned on a microplate reader at an excitation wavelength of 480 nm and an emission wavelength of 525 nm.

2.2. Binding affinity test of AFB1 to target Thiamine: Using a buffer (pH 7.4) as a diluent, the aptamer AFB1 (25 µL, 1 µmol/L) and 50 µL of different concentrations (0 µM/L, 2 µM/L, and 100 µM/L) of Thiamine solution were mixed in wells of a microplate. Each solution was incubated at 25° C. for 10 min. Then, the complementary strand CDNA (25 µL, 1 µmol/L, having a sequence as shown in SEQ ID NO: 9) of the aptamer and 20 µL 5×PG were added to the solution. After incubation for 5 min, the fluorescence intensity was scanned on a microplate reader at an excitation wavelength of 480 nm and an emission wavelength of 525 nm.

2.3. The method was the same as that in Step 2.2, except that the target was replaced by Metergoline, Diphenylpyralin, Abexinostat, Carbinoxamine, Dinitolmide, Duloxetine, Regadenoson, Idelalisib, Cefoselis, and Naftifine Hydrochloride respectively.

Figure 14:
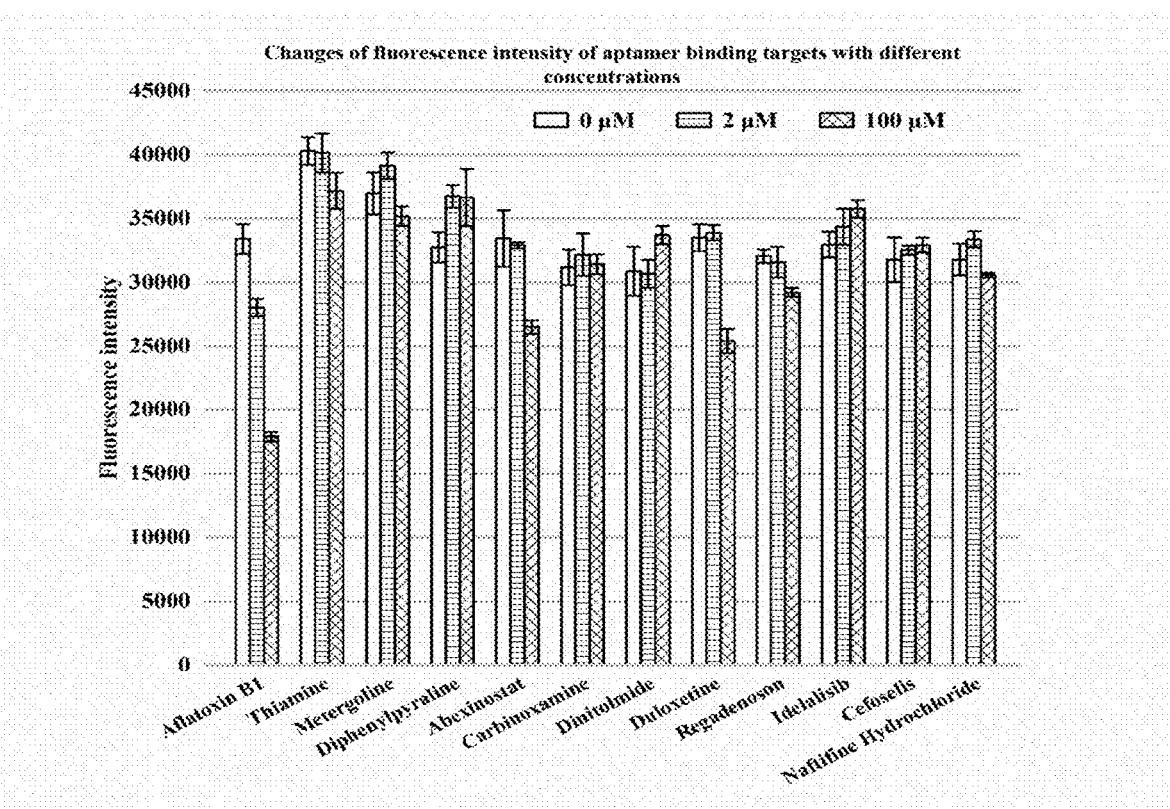
FIG. 14 shows the changes in fluorescence intensity of the AFB1 aptamer binding to different concentrations of targets.

The results are shown in FIG. 14. A total of 12 compounds are tested. Different concentrations (0 µM/L, 2 µM/L, and 100 µM/L) of compounds are bound to the aptamer AFB1. As the target concentration increases, the aptamer binds to the target, so the remaining unbound aptamer decreases, the double-stranded DNA formed by hybridizing with the complementary strand of the aptamer decreases, and the fluorescence intensity decreases. Accordingly, 4 targets with high affinity including Duloxetine, Thiamine, Metergoline and Naftifine Hydrochloride were selected, and the binding parameters were determined by ITC (isothermal titration calorimetry). The test data was fitted by support calculation software to obtain the dissociation constant.

3. Based on the Actual Results in Step 2, the Binding Parameters were Determined by ITC (Isothermal Titration Calorimetry).

3.1. Using a buffer as a diluent, the AFB1 was diluted into a solution with a concentration of 300 µmol/L, and the AFB1 aptamer was diluted into a solution with a concentration of 30 µmol/L. After titration by using an isothermal titration calorimeter, the data was plotted and fitted by support software to obtain the dissociation constant.

3.2. The same method as that in Step 3.1 was used, except that the Duloxetine was diluted into a solution with a concentration of 330 µmol/L, and the AFB1 aptamer was diluted into a solution with a concentration of 30 µmol/L.

3.3. The same method as that in Step 3.1 was used, except that the Thiamine was diluted into a solution with a concentration of 300 μmol/L, and the AFB1 aptamer was diluted into a solution with a concentration of 30 μmol/L.

3.4. The same method as that in Step 3.1 was used, except that the Metergoline was diluted into a solution with a concentration of 300 μmol/L, and the AFB1 aptamer was diluted into a solution with a concentration of 30 μmol/L.

3.5. The same method as that in Step 3.1 was used, except that the Naftifine Hydrochloride was diluted into a solution with a concentration of 300 μmol/L, and the AFB1 aptamer was diluted into a solution with a concentration of 30 μmol/L.

Figure 15:
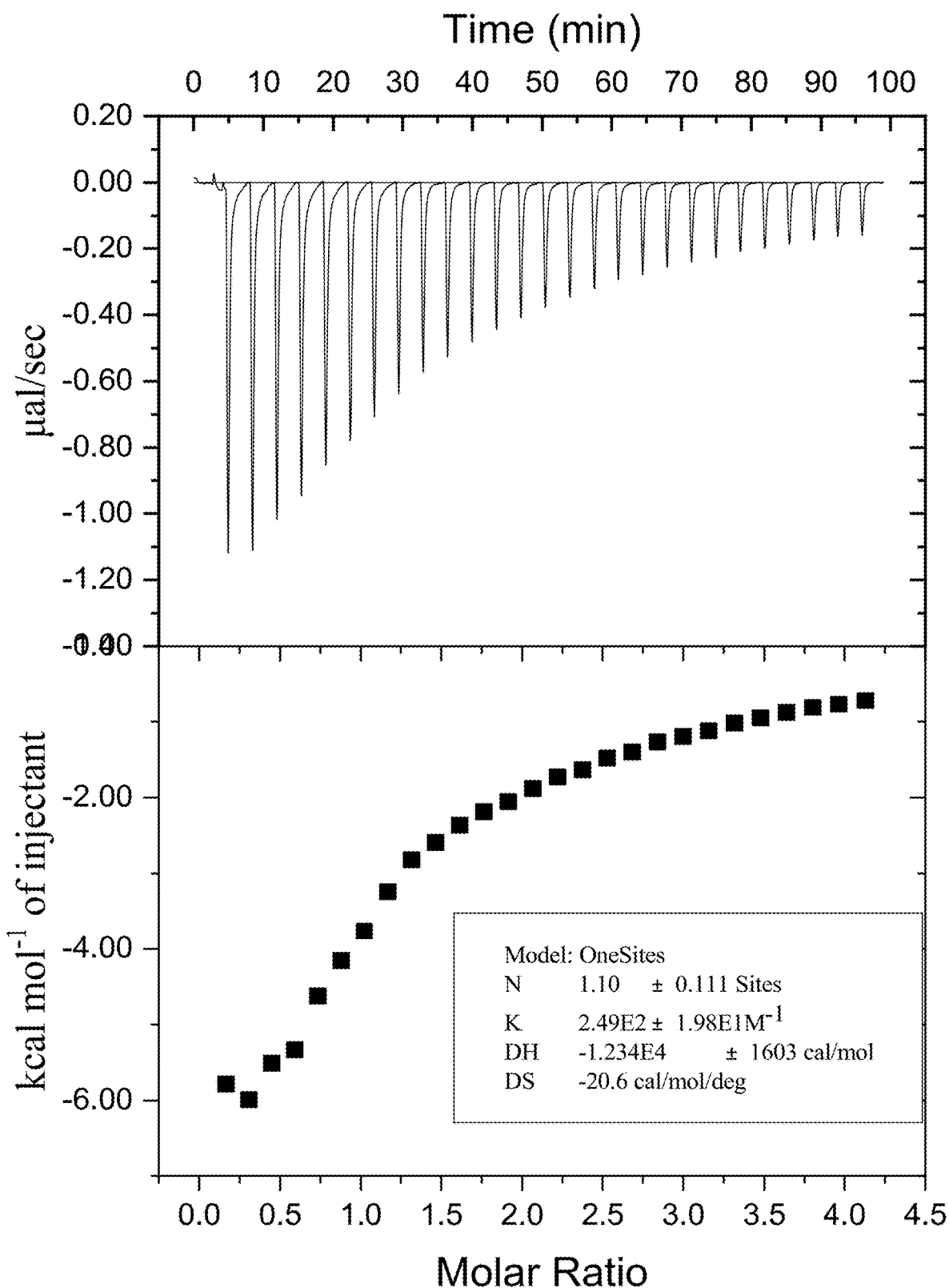
FIG. 15 shows the result of the ITC experiment of AFB1 with the AFB1 aptamer.
Figure 16:
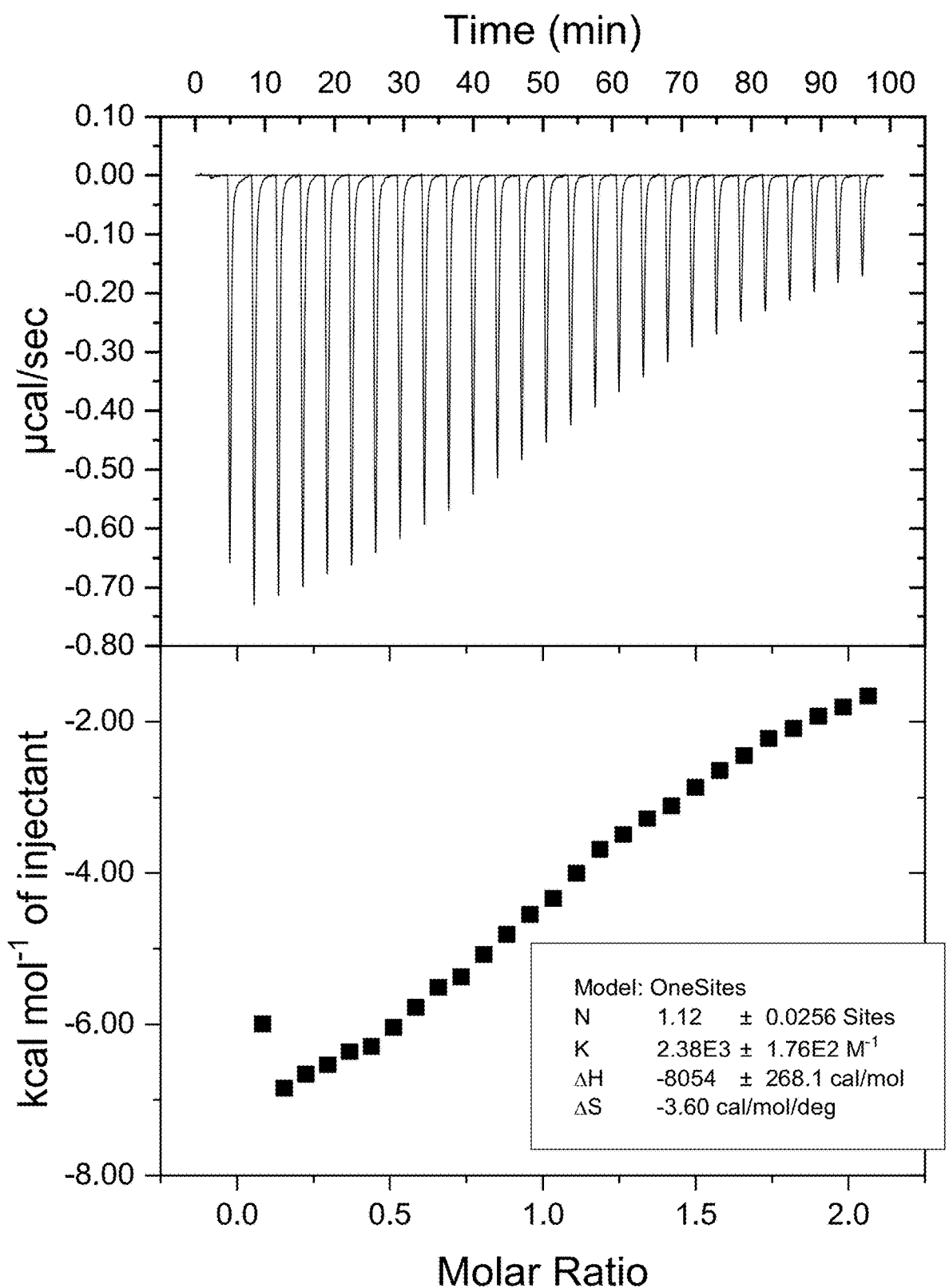
FIG. 16 shows the result of the ITC experiment of Duloxetine with the AFB1 aptamer.
Figure 17:
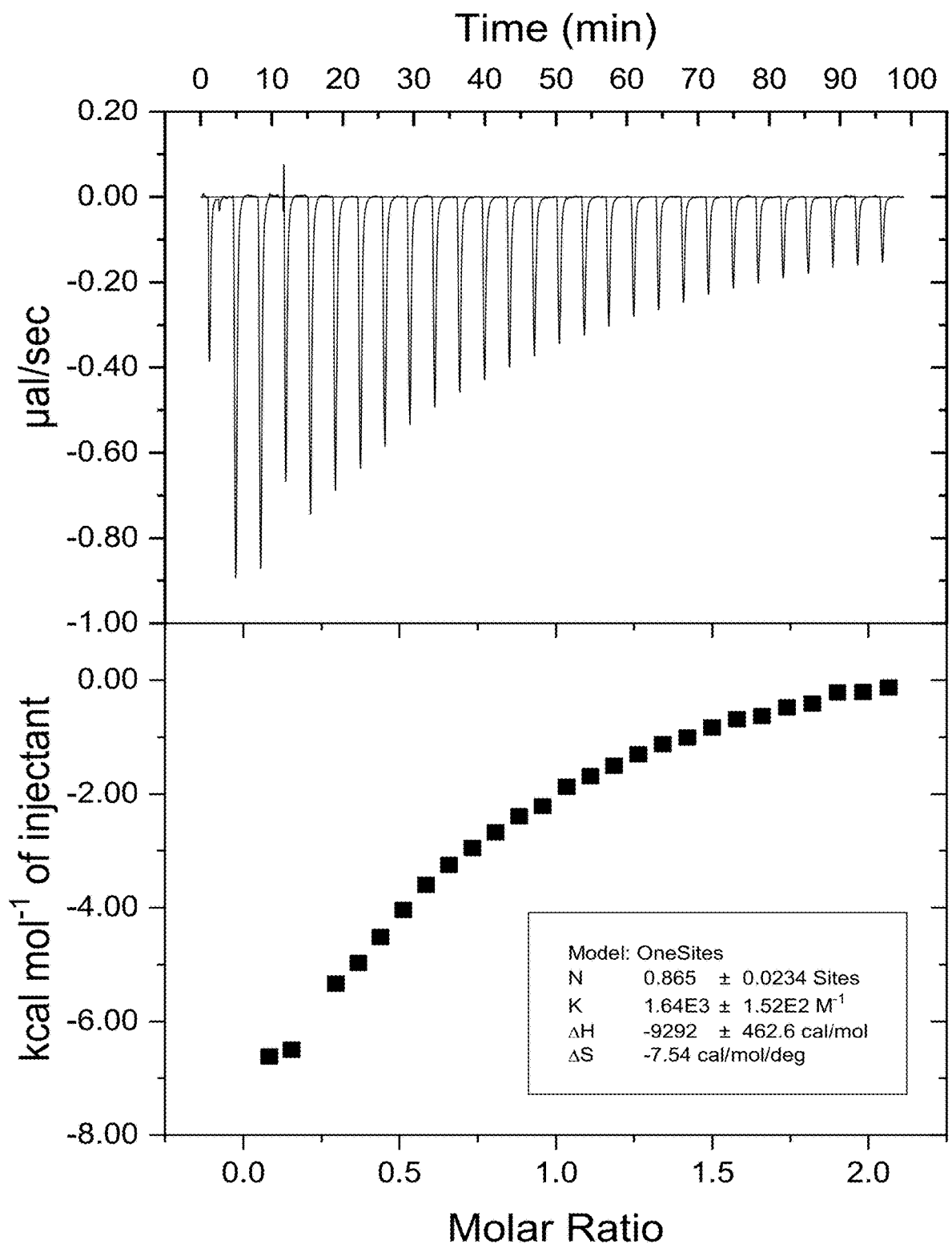
FIG. 17 shows the result of the ITC experiment of Metergoline with the AFB1 aptamer.

The experimental results are shown in FIGS. 15-17 (the data and figures are not presented for ones having weak or no binding). The AFB1 aptamer has a dissociation constant of 0.42 mM from the target Duloxetine, the AFB1 aptamer has a dissociation constant of 0.61 mM from the target Metergoline, and the binding affinity of the AFB1 aptamer to the target Thiamine and Naftifine Hydrochloride is weak. In a previous literature (Bagherzadeh K. In silico maturation affinity and selectivity of DNA aptamers against aflatoxin B1 for biosensor development[J]. Analytica Chimica Acta, 2020, 1105), the dissociation constant of the AFB1 aptamer from AFB1 is 4.02 mM. This indicates that targets with higher affinity to the aptamer OBA3 are screened out. Subsequently, the AFB1 aptamer was mutated and modified.

4. Virtual Saturation Mutation of Sites of AFB1 Aptamer

The original AFB1 aptamer is a DNA strand having 50 bases, and the bases in the core region (positions 5-9, and 30-34) were mutated. The mutation of bases at other sites located in the top and bottom regions is difficult to directly affect the target and thus affect the binding ability to the target since they are far away from the binding pocket. Therefore, considering the work efficiency, these two regions will not be mutated. The mutation sequence is shown in SEQ ID NO: 17.

There were a total of 10 specific mutation sites, and a total of 410 new sequences were generated. All possible 1048576 sequences were comprehensively analyzed, and the structure corresponding to minimum free energy and the minimum free energy were predicted by UNAFold and NUPACK software.

Next, base mutation was performed on the basis of the original binding conformation of the aptamer to obtain a hypothetical binding conformation of the mutant sequence. Then molecular dynamic simulation was performed by the software Amber, to determine whether the hypothetical binding mode is stable and whether it maintains a high binding affinity to the target. The original binding conformation was derived from the PDB library, and the base mutation was performed using X3DNA to obtain the hypothetical binding conformation of the mutant sequence. The simulation system first underwent 5 rounds of energy minimization optimization by steepest descent, and then slowly heated up to 300 k while the solute was constrained, followed by a constraint release process for 60 ps at a step length of 10 fs.

Next, the binding free energy was calculated. The binding ability of the aptamer to the target was a simulated path of the complex, a predicted value of the binding free energy was estimated by using the MMPBA method and the conformational entropy, and the binding free energy was calculated by GMXPBSA 2.1 in the GMXPBSAtool program package.

Virtual screening of the mutation sites was made according to the original docking score of the target AFB1 and the aptamer and the MMGBSA dG Bind (NS). In order to improve the screening efficiency, 2048 sequences with a small free energy barrier were selected and used as an enhanced sequence library. The screening criterion was that the free energy barrier ($\Delta\Delta G_{GAP}$) was less than 0.1 kcal/mol. Firstly, molecular dynamic simulation was performed on the 2048 sequences for 150 ps. Then, according to the structural stability, binding free energy, and number of hydrogen bonding between the aptamer and the target, 68 sequences were selected for 10 ns of molecular dynamic simulation. Next, 14 sequences were selected for molecular dynamic simulation for a long time of 100 ns in the third round of screening, to investigate the overall stability of the complex. Ultimately, it was found that except for the positions 8 and 31, there was no obvious base enrichment at other positions, and these bases were not enriched at the corresponding positions. Therefore, the sites A8 and T31 were selected and mutated into the base C and the base G respectively, to obtain the aptamer A8CT31G (having a sequence as shown in SEQ ID NO: 6); and into the base G and the base C respectively, to obtain the aptamer A8GT31C (having a sequence as shown in SEQ ID NO: 7). Then further experiments were carried out.

5. Mutation of AFB1 Aptamer

The base A at position 8 and the base T at position 31 from the 5' end to the 3' end of Aflatoxin B were mutated into the base C and the base G respectively, to obtain the aptamer A8CT31G (having a sequence as shown in SEQ ID NO: 6). The base A at position 8 and the base T at position 31 from the 5' end to the 3' end of AFB1 were mutated into the base G and the base C respectively, to obtain the aptamer A8GT31C (having a sequence as shown in SEQ ID NO: 7).

6. The Binding Parameters of the Aptamers A8GT31C and A8CT31G to the Targets AFB1, Duloxetine, and Metergoline were Determined by Isothermal Titration Calorimetry (ITC).

Figure 18:
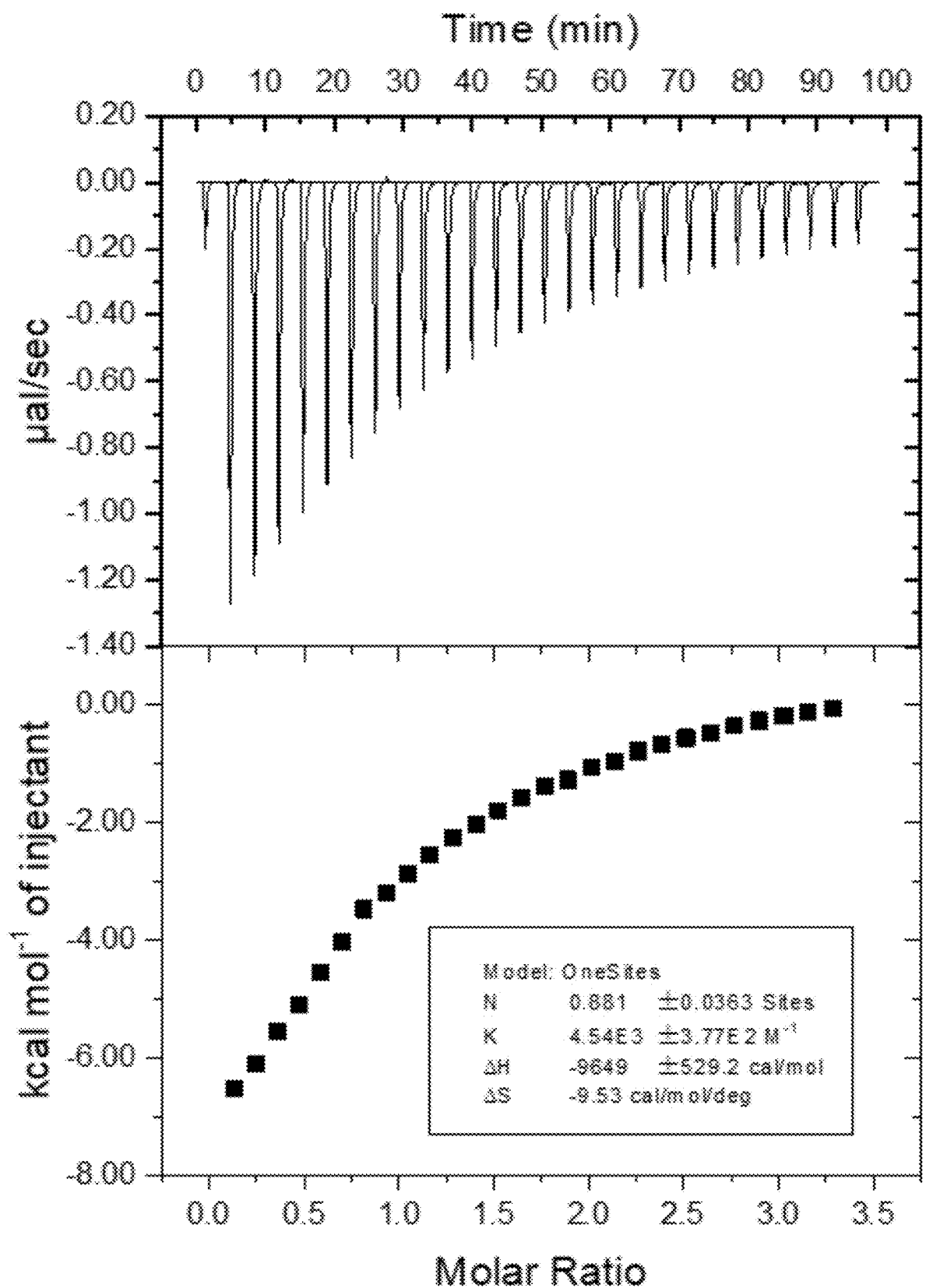
FIG. 18 shows the result of the ITC experiment of AFB1 with the A8CT31G aptamer.
Figure 19:
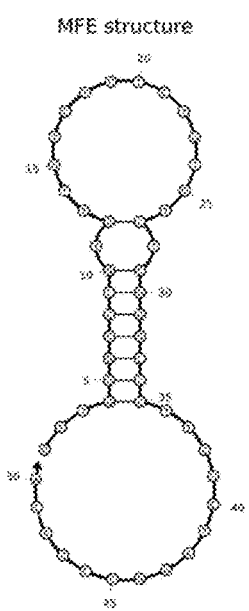
FIG. 19 shows the predicted secondary structure of the A8CT31G aptamer and the free energy of a single strand thereof, the predicted secondary structure of A8CT31G having a sequence as shown in SEQ ID NO: 6.

The experimental results are shown in FIG. 18 (the data and figures are not presented for ones having weak or no binding). The predicted secondary structure of the aptamer A8CT31G and the free energy of its single strand are shown in FIG. 19. A8CT31G only binds to the target AFB1, and has a dissociation constant of 0.22 μM; A8GT31C binds to the target AFB1 and the target Duloxetine weakly; and the dissociation constant of the AFB1 aptamer and the target AFB1 in a previous literature is 4.02 mM, indicating that after modification by the molecular modification and design method of the present invention, the binding specificity and affinity of the AFB1 aptamer to the target AFB1 are quickly and effectively improved.

Apparently, the above-described embodiments are merely examples provided for clarity of description, and are not intended to limit the implementations of the present invention. Other variations or changes can be made by those skilled in the art based on the above description. The embodiments are not exhaustive herein. Obvious variations or changes derived therefrom also fall within the protection scope of the present invention.

What is claimed is:

1. A molecularly modified aptamer for Ochratoxin A, having a sequence as shown in SEQ ID NO: 3.

2. A molecularly modified aptamer for Aflatoxin B1, having a sequence as shown in SEQ ID NO: 6.

* * * * *

SEQUENCE LISTING

<160> NUMBER OF SEQ ID NOS: 17

<210> SEQ ID NO 1
<211> LENGTH: 19
<212> TYPE: DNA
<213> ORGANISM: Artificial sequence
<220> FEATURE:
<223> OTHER INFORMATION: Aptamer OBA3

<400> SEQUENCE: 1
cggggcgaag cgggtcccg                                           19

<210> SEQ ID NO 2
<211> LENGTH: 19
<212> TYPE: DNA
<213> ORGANISM: Artificial sequence
<220> FEATURE:
<223> OTHER INFORMATION: Aptamer A9T

<400> SEQUENCE: 2
cggggcgatg cgggtcccg                                           19

<210> SEQ ID NO 3
<211> LENGTH: 19
<212> TYPE: DNA
<213> ORGANISM: Artificial sequence
<220> FEATURE:
<223> OTHER INFORMATION: Aptamer A9G

<400> SEQUENCE: 3
cggggcgagg cgggtcccg                                           19

<210> SEQ ID NO 4
<211> LENGTH: 19
<212> TYPE: DNA
<213> ORGANISM: Artificial sequence
<220> FEATURE:
<223> OTHER INFORMATION: Aptamer A9C

<400> SEQUENCE: 4
cggggcgacg cgggtcccg                                           19

<210> SEQ ID NO 5
<211> LENGTH: 50
<212> TYPE: DNA
<213> ORGANISM: Artificial sequence
<220> FEATURE:
<223> OTHER INFORMATION: Aptamer Aflatoxin B1

<400> SEQUENCE: 5
gttgggcacg tgttgtctct ctgtgtctcg tgcccttcgc taggcccaca          50

<210> SEQ ID NO 6
<211> LENGTH: 50
<212> TYPE: DNA
<213> ORGANISM: Artificial sequence
<220> FEATURE:
<223> OTHER INFORMATION: Aptamer A8CT31G

<400> SEQUENCE: 6
gttgggcccg tgttgtctct ctgtgtctcg ggcccttcgc taggcccaca          50

<210> SEQ ID NO 7
<211> LENGTH: 50
<212> TYPE: DNA
<213> ORGANISM: Artificial sequence

```
<220> FEATURE:
<223> OTHER INFORMATION: Aptamer A8GT31C

<400> SEQUENCE: 7
gttgggcgcg tgttgtctct ctgtgtctcg cgcccttcgc taggcccaca        50

<210> SEQ ID NO 8
<211> LENGTH: 19
<212> TYPE: DNA
<213> ORGANISM: Artificial sequence
<220> FEATURE:
<223> OTHER INFORMATION: Complementary strand DNA3

<400> SEQUENCE: 8
cgggacccgc ttcgccccg                                          19

<210> SEQ ID NO 9
<211> LENGTH: 50
<212> TYPE: DNA
<213> ORGANISM: Artificial sequence
<220> FEATURE:
<223> OTHER INFORMATION: Complementary strand CDNA

<400> SEQUENCE: 9
tgtgggccta gcgaagggca cgagacacag agagacaaca cgtgcccaac        50

<210> SEQ ID NO 10
<211> LENGTH: 18
<212> TYPE: DNA
<213> ORGANISM: Artificial sequence
<220> FEATURE:
<223> OTHER INFORMATION: Aptamer OBAwt

<400> SEQUENCE: 10
ggggtgaaac gggtcccg                                           18

<210> SEQ ID NO 11
<211> LENGTH: 19
<212> TYPE: DNA
<213> ORGANISM: Artificial sequence
<220> FEATURE:
<223> OTHER INFORMATION: Aptamer OBA1

<400> SEQUENCE: 11
cggggtgaaa cgggtcccg                                          19

<210> SEQ ID NO 12
<211> LENGTH: 18
<212> TYPE: DNA
<213> ORGANISM: Artificial sequence
<220> FEATURE:
<223> OTHER INFORMATION: Aptamer OBA2

<400> SEQUENCE: 12
ggggcgaagc gggtcccg                                           18

<210> SEQ ID NO 13
<211> LENGTH: 17
<212> TYPE: DNA
<213> ORGANISM: Artificial sequence
<220> FEATURE:
<223> OTHER INFORMATION: Aptamer OBA4

<400> SEQUENCE: 13
ggggtgaaac ggtcccg                                            17
```

```
<210> SEQ ID NO 14
<211> LENGTH: 21
<212> TYPE: DNA
<213> ORGANISM: Artificial sequence
<220> FEATURE:
<223> OTHER INFORMATION: Aptamer OBA5

<400> SEQUENCE: 14
ccggggcgaa gcgggtcccg g                                              21

<210> SEQ ID NO 15
<211> LENGTH: 21
<212> TYPE: DNA
<213> ORGANISM: Artificial sequence
<220> FEATURE:
<223> OTHER INFORMATION: Aptamer OBA6

<400> SEQUENCE: 15
gcggggcgaa gcgggtcccg c                                              21

<210> SEQ ID NO 16
<211> LENGTH: 19
<212> TYPE: DNA
<213> ORGANISM: Artificial sequence
<220> FEATURE:
<223> OTHER INFORMATION: Aptamer OBA6 mutation sequence
<220> FEATURE:
<221> NAME/KEY: misc_feature
<222> LOCATION: (1)..(3)
<223> OTHER INFORMATION: n is a, c, g, or t
<220> FEATURE:
<221> NAME/KEY: misc_feature
<222> LOCATION: (6)..(10)
<223> OTHER INFORMATION: n is a, c, g, or t
<220> FEATURE:
<221> NAME/KEY: misc_feature
<222> LOCATION: (13)..(14)
<223> OTHER INFORMATION: n is a, c, g, or t
<220> FEATURE:
<221> NAME/KEY: misc_feature
<222> LOCATION: (17)..(19)
<223> OTHER INFORMATION: n is a, c, g, or t

<400> SEQUENCE: 16
nnnggnnnnn cgnntcnnn                                                 19

<210> SEQ ID NO 17
<211> LENGTH: 50
<212> TYPE: DNA
<213> ORGANISM: Artificial sequence
<220> FEATURE:
<223> OTHER INFORMATION: Aptamer AFB1 mutation sequence
<220> FEATURE:
<221> NAME/KEY: misc_feature
<222> LOCATION: (5)..(9)
<223> OTHER INFORMATION: n is a, c, g, or t
<220> FEATURE:
<221> NAME/KEY: misc_feature
<222> LOCATION: (30)..(34)
<223> OTHER INFORMATION: n is a, c, g, or t

<400> SEQUENCE: 17
gttgnnnnng tgttgtctct ctgtgtctcn nnnncttcgc taggcccaca               50
```